(12) United States Patent
Yoshimi

(10) Patent No.: US 7,954,333 B2
(45) Date of Patent: Jun. 7, 2011

(54) AIR CONDITIONER

(75) Inventor: Manabu Yoshimi, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 416 days.

(21) Appl. No.: 12/298,667

(22) PCT Filed: Apr. 27, 2007

(86) PCT No.: PCT/JP2007/059173
§ 371 (c)(1),
(2), (4) Date: Oct. 27, 2008

(87) PCT Pub. No.: WO2007/126055
PCT Pub. Date: Nov. 8, 2007

(65) Prior Publication Data
US 2009/0255284 A1    Oct. 15, 2009

(30) Foreign Application Priority Data

Apr. 28, 2006 (JP) ................. 2006-125737

(51) Int. Cl.
*G01K 13/00* (2006.01)
*F25B 49/00* (2006.01)
*F25B 45/00* (2006.01)
(52) U.S. Cl. .................. 62/129; 62/127; 62/149
(58) Field of Classification Search ........... 62/126, 62/127, 129, 149, 77, 216; 700/278
See application file for complete search history.

(56) References Cited

U.S. PATENT DOCUMENTS
5,214,918 A    6/1993  Oguni et al.
2002/0033252 A1   3/2002  Sasao et al.

FOREIGN PATENT DOCUMENTS
| JP | H03-186170 A | 8/1991 |
| JP | H06-074621 A | 3/1994 |
| JP | 2002-089929 A | 3/2002 |
| JP | 2006-023072 A | 1/2006 |
| JP | 2006-058007 A | 3/2006 |
| KR | 1995-0029693 A | 11/1995 |
| WO | WO-2005/121664 A1 | 12/2005 |

OTHER PUBLICATIONS

Office Action of corresponding Korean Application No. 10-2008-7027198 dated Oct. 14, 2010.

*Primary Examiner* — Chen-Wen Jiang
(74) *Attorney, Agent, or Firm* — Global IP Counselors

(57) ABSTRACT

A refrigerant circuit and an operation control means are provided. A refrigerant circuit is configured by the interconnection of a heat source unit, a plurality of utilization units, and expansion mechanisms. The heat source unit has a compressor and a heat source side heat exchanger. The utilization units have utilization side heat exchangers. The operation control means is capable of performing a refrigerant quantity judging operation to control constituent equipment such that a first state value becomes a first target control value. In addition, during the refrigerant quantity judging operation, the operation control means maintains a cooling capacity of a first utilization unit among the plurality of utilization units, which air conditions a predetermined space.

20 Claims, 12 Drawing Sheets

AIR CONDITIONER

CROSS-REFERENCE TO RELATED APPLICATIONS

This U.S. National stage application claims priority under 35 U.S.C. §119(a) to Japanese Patent Application No. 2006-125737, filed in Japan on Apr. 28, 2006, the entire contents of which are hereby incorporated herein by reference.

TECHNICAL FIELD

The present invention relates to a function to judge the adequacy of the refrigerant quantity in a refrigerant circuit of an air conditioner. More specifically, the present invention relates to an air conditioner having a function to judge the adequacy of the refrigerant quantity in a refrigerant circuit of an air conditioner configured by the interconnection of a compressor, a condenser, an expansion mechanism, and an evaporator.

BACKGROUND ART

Conventionally, for a refrigerant system having a refrigerant circuit configured by the interconnection of a compressor, a condenser, an expansion valve, and an evaporator, an approach has been proposed in which a refrigerant quantity judging operation to judge the excess or deficiency of the refrigerant quantity in the refrigerant circuit is performed in order to judge the excess or deficiency of the refrigerant quantity in the refrigerant circuit (for example, see JP-A Publication No. H3-186170).

SUMMARY OF THE INVENTION

Object to be Achieved by the Invention

However, there is a case where the indoor unit is disposed in a room such as a machine room where a cooling operation is required at all times (hereinafter referred to as "machine room"). In this case, when target control values are provided without taking into account the cooling load of the machine room, during the above described refrigerant quantity judging operation, the cooling capacity of the indoor unit in the machine room may become insufficient in some cases, which may cause a problem in equipment (such as a sever) in the machine room.

An object of the present invention is to suppress a rise in the temperature in the machine room due to the insufficient capacity of the indoor unit even in the refrigerant quantity detection operation, and to reduce the occurrence of defects in equipment in the machine room.

Means to Achieved the Object

An air conditioner according to a first aspect of the present invention includes a refrigerant circuit and an operation control means. The refrigerant circuit is configured by the interconnection of a heat source unit, a plurality of utilization units, and an expansion mechanism. The heat source unit includes a compressor and a heat source side heat exchanger. Each utilization unit includes a utilization side heat exchanger. The operation control means is capable of performing a refrigerant quantity judging operation to control constituent equipment such that a first state value becomes a first target control value. In addition, during the refrigerant quantity judging operation, the operation control means maintains a cooling capacity of a first utilization unit among the plurality of utilization units, which air conditions a predetermined space.

There is a case where the utilization unit is disposed in the predetermined space such as a machine room (hereinafter referred to as "machine room") where a cooling operation is required at all times. In this case, when target control values for a detection operation (for example, target low pressure, target superheating degree, and the like) are provided to evaporators in the heat source unit and the utilization units without taking into account the cooling load of the machine room, during the refrigerant quantity detection operation, the cooling capacity of the utilization unit in the machine room may become insufficient in some cases, which may cause a problem in equipment (such as a sever) in the machine room.

In this air conditioner, even in such refrigerant quantity detection operation, the utilization unit in the machine room is caused to operate at the capacity sufficient to the cooling load of the machine room, thereby enabling to suppress a rise in the temperature in the machine room due to the insufficient capacity of the utilization unit and to reduce the occurrence of defects in equipment in the machine room.

An air conditioner according to a second aspect of the present invention is the air conditioner according to the first aspect of the present invention, wherein the first target control value is a target low pressure. In the refrigerant quantity judging operation, the operation control means controls constituent equipment such that a pressure of the refrigerant on a suction side of the compressor or an operation state quantity equivalent to the pressure becomes constant at the target low pressure.

In this air conditioner, the target low pressure is the first target control value, and in the refrigerant quantity judging operation, the operation control means controls constituent equipment such that the pressure of the refrigerant on the suction side of the compressor or the operation state quantity equivalent to the pressure becomes constant at the target low pressure.

Consequently, in the refrigerant quantity judging operation to control constituent equipment such that the operation state quantity becomes constant at the target low pressure, the utilization unit in the machine room is caused to operate at the capacity sufficient to the cooling load of the machine room, thereby enabling to suppress a rise in the temperature in the machine room due to the insufficient capacity of the utilization unit and to reduce the occurrence of defects in equipment in the machine room.

An air conditioner according to a third aspect of the present invention is the air conditioner according to the first aspect of the present invention, wherein the first target control value is a target superheating degree. In the refrigerant quantity judging operation, the operation control means causes the utilization side heat exchanger to function as an evaporator of the refrigerant, and also controls constituent equipment such that a superheating degree of the refrigerant sent from the utilization side heat exchanger to the compressor becomes constant at the target superheating degree.

In this air conditioner, the target superheating degree is the first target control value, and in the refrigerant quantity judging operation, the operation control means causes the utilization side heat exchanger to function as an evaporator of the refrigerant, and also controls constituent equipment such that the superheating degree of the refrigerant sent from the utilization side heat exchanger to the compressor becomes constant at the target superheating degree.

Consequently, in the refrigerant quantity judging operation to control constituent equipment such that the operation state quantity becomes constant at the target superheating degree, the utilization unit in the machine room is caused to operate at the capacity sufficient to the cooling load of the machine room, thereby enabling to suppress a rise in the temperature in the machine room due to the insufficient capacity of the utilization unit and to reduce the occurrence of defects in equipment in the machine room.

An air conditioner according to a fourth aspect of the present invention is the air conditioner according to any one of the first through third aspects of the present invention, further including a history recording means. The history recording means is capable of recording history of a second target control value that is a target control value of the first utilization unit. During the refrigerant quantity judging operation, the operation control means derives the second target control value used before the refrigerant quantity judging operation based on the history, and controls the first utilization unit at the second target control value.

In this air conditioner, the second target control value of the first utilization unit used before the refrigerant quantity judging operation is recorded as history, and during the refrigerant quantity judging operation, the first utilization unit is controlled in the same manner as before the refrigerant quantity judging operation based on the history. Thereby the cooling capacity of the first utilization unit is maintained at the level equivalent to the cooling capacity required before the refrigerant quantity judging operation.

Consequently, it is possible to maintain the cooling capacity of the first utilization unit at the level of the capacity required before the refrigerant quantity judging operation. Thus, even in the refrigerant quantity detection operation, the utilization unit in the machine room can be caused to operate at the capacity sufficient to the cooling load of the machine room, and it is possible to suppress a rise in the temperature in the machine room due to the insufficient capacity of the utilization unit and to reduce the occurrence of defects in equipment in the machine room.

An air conditioner according to a fifth aspect of the present invention is the air conditioner according to the fourth aspect of the present invention, wherein the second target control value is a target superheating degree of the first utilization unit.

In this air conditioner, the target superheating degree of the first utilization unit is recorded as history, and during the refrigerant quantity judging operation, the first utilization unit is controlled in the same manner as before the refrigerant quantity judging operation based on the history. Thereby the cooling capacity of the first utilization unit is maintained at the level equivalent to the cooling capacity required before the refrigerant quantity judging operation.

In the present invention, the target superheating degree of the first utilization unit is recorded as history. Thus, it is possible to maintain the cooling capacity of the first utilization unit at the level equivalent to the capacity required before the refrigerant quantity judging operation. Consequently, even in the refrigerant quantity detection operation, the utilization unit in the machine room can be caused to operate at the capacity sufficient to the cooling load of the machine room, and it is possible to suppress a rise in the temperature in the machine room due to the insufficient capacity of the utilization unit and to reduce the occurrence of defects in equipment in the machine room.

An air conditioner according to a sixth aspect of the present invention is the air conditioner according to any one of the first through third aspects of the present invention, further including an environment information obtaining means and a target value derivation means. The environment information obtaining means is capable of obtaining environment information regarding the outside of the building or the inside of the predetermined space. The target value derivation means derives a third target control value at which the predetermined space is optimally air conditioned based on the environment information. The operation control means controls the operation of the first utilization unit based on the third target control value.

In this air conditioner, the third target control value at which the predetermined space is optimally air conditioned is derived based on the environment information by monitoring the environment information regarding the inside of the predetermined space.

In the present invention, during the refrigerant quantity judging operation, the first utilization unit is controlled based on this third target control value. Thus, it is possible to maintain the cooling capacity of the first utilization unit at the level equivalent to the capacity required before the refrigerant quantity judging operation. Consequently, even in the refrigerant quantity judging operation, the utilization unit in the machine room can be caused to operate at the capacity sufficient to the cooling load of the machine room, and it is possible to suppress a rise in the temperature in the machine room due to the insufficient capacity of the utilization unit and to reduce the occurrence of defects in equipment in the machine room.

An air conditioner according to a seventh aspect of the present invention is the air conditioner according to the sixth aspect of the present invention, wherein the third target control value is a target superheating degree of the first utilization unit.

In this air conditioner, the target superheating degree of the first utilization unit as the third target control value at which the predetermined space is optimally air conditioned is derived based on the environment information by monitoring the environment information regarding the inside of the predetermined space.

In the present invention, during the refrigerant quantity judging operation, the first utilization unit is controlled based on this superheating degree. Thus, it is possible to maintain the cooling capacity of the first utilization unit at the level equivalent to the capacity required before the refrigerant quantity judging operation. Consequently, even in the refrigerant quantity detection operation, the utilization unit in the machine room can be caused to operate at the capacity sufficient to the cooling load of the machine room, and it is possible to suppress a rise in the temperature in the machine room due to the insufficient capacity of the utilization unit and to reduce the occurrence of defects in equipment in the machine room.

An air conditioner according to an eighth aspect of the present invention is the air conditioner according to the sixth aspect of the present invention, wherein the environment information obtaining means is a temperature sensor provided in the heat source unit, and obtains an outside air temperature as the environment information.

In this air conditioner, the temperature sensor provided in the heat source unit obtains the outside air temperature as the environment information. Then, during the refrigerant quantity judging operation, the third target control value at which the predetermined space is optimally air conditioned is derived based on this outside air temperature.

In the present invention, during the refrigerant quantity judging operation, the first utilization unit is controlled based on the third target control value. Thus, it is possible to maintain the cooling capacity of the first utilization unit at the level equivalent to the capacity required before the refrigerant quantity judging operation. Consequently, even in the refrigerant quantity detection operation, the utilization unit in the machine room can be caused to operate at the capacity sufficient to the cooling load of the machine room, and it is possible to suppress a rise in the temperature in the machine room due to the insufficient capacity of the utilization unit and to reduce the occurrence of defects in equipment in the machine room.

An air conditioner according to a ninth aspect of the present invention is the air conditioner according to the sixth aspect of the present invention, wherein the environment information obtaining means is a temperature sensor provided in the predetermined space, and obtains a temperature in the predetermined space as the environment information.

In this air conditioner, the temperature sensor provided in the predetermined space obtains the temperature in the predetermined space as the environment information. Then, during the refrigerant quantity judging operation, the third target control value at which the predetermined space is optimally air conditioned is derived based on this temperature in the predetermined space.

In the present invention, during the refrigerant quantity judging operation, the first utilization unit is controlled based on the third target control value. Thus, it is possible to maintain the cooling capacity of the first utilization unit at the level equivalent to the capacity required before the refrigerant quantity judging operation. Thus, even in the refrigerant quantity detection operation, the utilization unit in the machine room can be operated at the capacity sufficient to the cooling load of the machine room, and it is possible to suppress a rise in the temperature in the machine room due to the insufficient capacity of the utilization unit and to reduce the occurrence of defects in equipment in the machine room.

An air conditioner according to a tenth aspect of the present invention is the air conditioner according to the sixth aspect of the present invention, wherein the environment information obtaining means obtains, via a network, meteorological information from a meteorological information provision server capable of providing the meteorological information as the environment information.

This air conditioner is connected to the network, and obtains the meteorological information as the environment information via the network. Then, during the refrigerant quantity judging operation, the third target control value at which the predetermined space is optimally air conditioned is derived based on this meteorological information.

In the present invention, during the refrigerant quantity judging operation, the first utilization unit is controlled based on the third target control value. Thus, it is possible to maintain the cooling capacity of the first utilization unit at the level equivalent to the capacity required before the refrigerant quantity judging operation. Consequently, even in the refrigerant quantity detection operation, the utilization unit in the machine room can be caused to operate at the capacity sufficient to the cooling load of the machine room, and it is possible to suppress a rise in the temperature in the machine room due to the insufficient capacity of the utilization unit and to reduce the occurrence of defects in equipment in the machine room.

Effects of the Invention

In the air conditioner according to the first aspect of the present invention, even in the refrigerant quantity detection operation, the utilization unit in the machine room is caused to operate at the capacity sufficient to the cooling load of the machine room, thereby enabling to suppress a rise in the temperature in the machine room due to the insufficient capacity of the utilization unit and to reduce the occurrence of defects in equipment in the machine room.

In the air conditioner according to the second aspect of the present invention, in the refrigerant quantity judging operation to control constituent equipment such that the operation state quantity becomes constant at the target low pressure, the utilization unit in the machine room is caused to operate at the capacity sufficient to the cooling load of the machine room, thereby enabling to suppress a rise in the temperature in the machine room due to the insufficient capacity of the utilization unit and to reduce the occurrence of defects in equipment in the machine room.

In the air conditioner according to the third aspect of the present invention, in the refrigerant quantity judging operation to control constituent equipment such that the operation state quantity becomes constant at the target superheating degree, the utilization unit in the machine room is caused to operate at the capacity sufficient to the cooling load of the machine room, thereby enabling to suppress a rise in the temperature in the machine room due to the insufficient capacity of the utilization unit and to reduce the occurrence of defects in equipment in the machine room.

In the air conditioner according to the fourth aspect of the present invention, the second target control value of the first utilization unit used before the refrigerant quantity judging operation is recorded as a history, and during the refrigerant quantity judging operation, the first utilization unit is controlled in the same manner as before the refrigerant quantity judging operation based on the history. Thereby the cooling capacity of the first utilization unit is maintained at the level equivalent to the cooling capacity required before the refrigerant quantity judging operation.

In the air conditioner according to the fifth aspect of the present invention, the target superheating degree of the first utilization unit is recorded as history. Thus, it is possible to maintain the cooling capacity of the first utilization unit at the level equivalent to the capacity required before the refrigerant quantity judging operation. Consequently, even in the refrigerant quantity detection operation, the utilization unit in the machine room can be caused to operate at the capacity sufficient to the cooling load of the machine room, and it is possible to suppress a rise in the temperature in the machine room due to the insufficient capacity of the utilization unit and to reduce the occurrence of defects in equipment in the machine room.

In the air conditioner according to the sixth aspect of the present invention, during the refrigerant quantity judging operation, the first utilization unit is controlled based on this third target control value. Thus, it is possible to maintain the cooling capacity of the first utilization unit at the level equivalent to the capacity required before the refrigerant quantity judging operation. Consequently, even in the refrigerant quantity judging operation, the utilization unit in the machine room can be caused to operate at the capacity sufficient to the cooling load of the machine room, and it is possible to suppress a rise in the temperature in the machine room due to the insufficient capacity of the utilization unit and to reduce the occurrence of defects in equipment in the machine room.

In the air conditioner according to the seventh aspect of the present invention, during the refrigerant quantity judging operation, the first utilization unit is controlled based on the superheating degree. Thus, it is possible to maintain the cooling capacity of the first utilization unit at the level equivalent to the capacity required before the refrigerant quantity judging operation. Consequently, even in the refrigerant quantity detection operation, the utilization unit in the machine room can be caused to operate at the capacity sufficient to the cooling load of the machine room, and it is possible to suppress a rise in the temperature in the machine room due to the insufficient capacity of the utilization unit and to reduce the occurrence of defects in equipment in the machine room.

In the air conditioner according to the eighth aspect of the present invention, during the refrigerant quantity judging operation, the first utilization unit is controlled based on the third target control value. Thus, it is possible to maintain the cooling capacity of the first utilization unit at the level equivalent to the capacity required before the refrigerant quantity judging operation. Consequently, even in the refrigerant quantity detection operation, the utilization unit in the machine room can be operated at the capacity sufficient to the cooling load of the machine room, and it is possible to suppress a rise in the temperature in the machine room due to the insufficient capacity of the utilization unit and to reduce the occurrence of defects in equipment in the machine room.

In the air conditioner according to the ninth aspect of the present invention, during the refrigerant quantity judging operation, the first utilization unit is controlled based on the third target control value. Thus, it is possible to maintain the cooling capacity of the first utilization unit at the level equivalent to the capacity required before the refrigerant quantity judging operation. Thus, even in the refrigerant quantity detection operation, the utilization unit in the machine room can be caused to operate at the capacity sufficient to the cooling load of the machine room, and it is possible to suppress a rise in the temperature in the machine room due to the insufficient capacity of the utilization unit and to reduce the occurrence of defects in equipment in the machine room.

In the air conditioner according to the tenth aspect of the present invention, during the refrigerant quantity judging operation, the first utilization unit is controlled based on the third target control value. Thus, it is possible to maintain the cooling capacity of the first utilization unit at the level equivalent to the capacity required before the refrigerant quantity judging operation. Consequently, even in the refrigerant quantity detection operation, the utilization unit in the machine room can be caused to operate at the capacity sufficient to the cooling load of the machine room, and it is possible to suppress a rise in the temperature in the machine room due to the insufficient capacity of the utilization unit and to reduce the occurrence of defects in equipment in the machine room.

DETAILED DESCRIPTION OF THE INVENTION

In the following, an embodiment of an air conditioner according to the present invention is described based on the drawings.

(1) Configuration of the Air Conditioner

Figure 1:
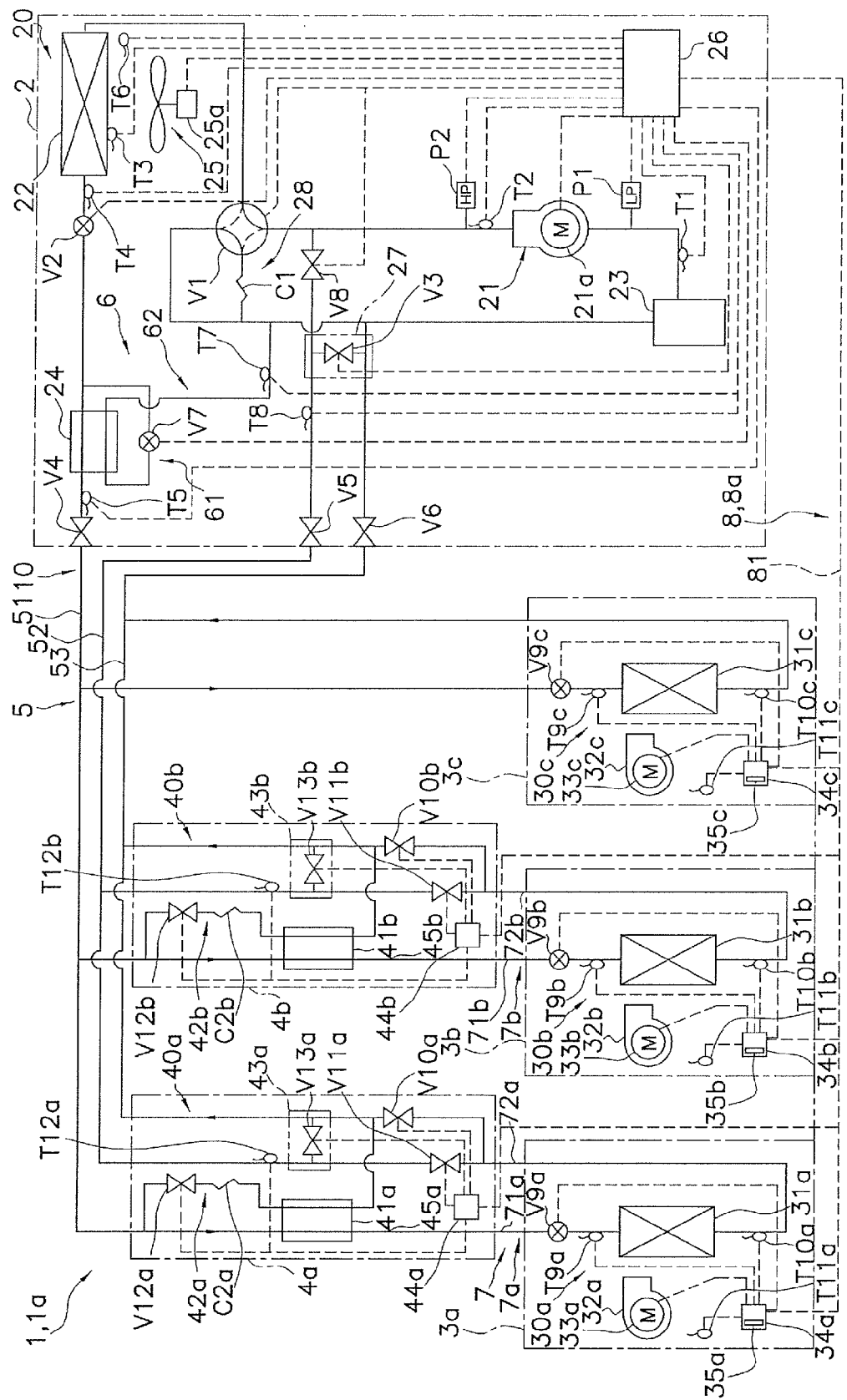
FIG. 1 is a schematic configuration view of an air conditioner according to an embodiment of the present invention.

FIG. 1 is a schematic configuration view of an air conditioner 1 according to an embodiment of the present invention. The air conditioner 1 is a device that is used to cool and heat a room in a building and the like by performing a vapor compression-type refrigeration cycle operation. Here, it is assumed that the building has rooms for offices and the like and a mechanical room where a cooling load is required at all times.

The air conditioner 1 mainly includes: one outdoor unit 2 as a heat source unit; a plurality (three in the present embodiment) of indoor units 3a to 3c as utilization units connected in parallel to the outdoor unit 2; connection units 4a and 4b provided respectively correspondingly to the indoor units 3a and 3b; a first refrigerant communication pipe group 5 that interconnects the outdoor unit 2, the connection units 4a and 4b, and the indoor unit 3c; and a second refrigerant communication pipe group 7 that interconnects the connection units 4a and 4b and the indoor units 3a and 3b. Here, the indoor unit 3c is provided in the machine room where a cooling load is required at all times, and is a cooling-only indoor unit. The first refrigerant communication pipe group 5 is configured by a first liquid refrigerant communication pipe 51, a high pressure gas refrigerant communication pipe 52, and a low pressure gas refrigerant communication pipe 53, and the second refrigerant communication pipe group 7 is configured by second liquid refrigerant communication pipes 71a and 71b and second gas refrigerant communication pipes 72a and 72b. In other words, the vapor compression-type refrigeration circuit 10 of the air conditioner 1 in the present embodiment is configured by the interconnection of the outdoor unit 2, the indoor units 3a to 3c, the connection units 4a and 4b, the first refrigerant communication pipe group 5, and the second refrigerant communication pipe group 7.

This air conditioner 1 is configured to be able to perform a simultaneous cooling and heating operation according to the demand of the air-conditioned space in a room, where the indoor units 3a and 3b are installed, for example, as in the case where a cooling operation is performed in one air-conditioned space and a heating operation is performed in another air conditioned-space or the like. In addition, the indoor unit 3c in the machine room is configured to be able to perform a cooling operation at all times according to the cooling load of the machine room.

<Indoor Unit>

The indoor units 3a to 3c are installed by being embedded in or hung from a ceiling of a room in a building and the like or by being mounted or the like on a wall surface of a room. The indoor units 3a and 3b are connected to the connection units 4a and 4b via the second refrigerant communication pipe group 7, and configure a part of the refrigerant circuit 10.

In addition, the indoor unit 3c is connected to the outdoor unit 2 via the first refrigerant communication pipe group 5, and configures a part of the refrigerant circuit 10 as is the case with the indoor units 3a and 3b.

Next, the configurations of the indoor units 3a to 3c are described. Note that, because the indoor units 3a, 3b, and 3c all have the same configuration, only the configuration of the indoor unit 3a is described here, and in regard to the configurations of the indoor units 3b and 3c, reference symbols Xb and Xc are used instead of reference symbols Xa representing the respective portions of the indoor unit 3a, and descriptions of those respective portions are omitted. For example, an indoor fan 32a of the indoor unit 3a corresponds to indoor fans 32b and 32c of the indoor units 3b and 3c.

The indoor unit 3a mainly includes an indoor side refrigerant circuit 30a that configures a part of the refrigerant circuit 10. The indoor side refrigerant circuit 30a mainly includes an indoor expansion valve V9a as an expansion mechanism and an indoor heat exchanger 31a as a utilization side heat exchanger.

The indoor expansion valve V9a is an electrically powered expansion valve connected to the liquid side of the indoor heat exchanger 31a in order to adjust the flow rate or the like of the refrigerant flowing in the indoor side refrigerant circuit 30a.

The indoor heat exchanger 31a is a fin-and-tube type heat exchanger of a cross fin system configured by a heat transfer tube and numerous fins, and is a heat exchanger that functions as an evaporator for the refrigerant during the cooling operation to cool the indoor air and functions as a condenser for the refrigerant during the heating operation to heat the indoor air.

In addition, the indoor unit 3a includes the indoor fan 32a as a ventilation fan for sucking indoor air into the unit, causing the air to heat exchange with the refrigerant in the indoor heat exchanger 31a, and then supplying the air to the room as supply air. The indoor fan 32a is a fan capable of varying an air flow rate Wr of the air which is supplied to the indoor heat exchanger 31a, and in the present embodiment, is a centrifugal fan, multi-blade fan, or the like, which is driven by a motor 33a comprising a DC fan motor.

In addition, various sensors are disposed in the indoor unit 3a. A liquid side temperature sensor T9a that detects the temperature of the refrigerant (i.e., the refrigerant temperature corresponding to a condensation temperature Tc during the heating operation or an evaporation temperature Te during the cooling operation) is disposed at the liquid side of the indoor heat exchanger 31a. A gas side temperature sensor T10a that detects a temperature Teo of the refrigerant is disposed at the gas side of the indoor heat exchanger 31a. A room temperature sensor T11a that detects the temperature of indoor air that flows into the unit (i.e., a room temperature Tr) is disposed at the indoor air suction side of the indoor unit 3a. In the present embodiment, the liquid side temperature sensor 19a, the gas side temperature sensor T10a, and the room temperature sensor T11a comprise thermistors. In addition, the indoor unit 3a includes an indoor side controller 34a that controls the operation of each portion constituting the indoor unit 3a. Additionally, the indoor side controller 34a includes a microcomputer, a memory and the like disposed in order to control the indoor unit 3a, and is configured such that it can exchange control signals and the like with a remote controller (not shown) for individually operating the indoor unit 3a, exchange control signals and the like with the outdoor unit 2 and the connection units 4a and 4b via a transmission line 81, and the like. In addition, the indoor side controller 34a is configured so as to be able to periodically record target control values of the indoor unit 3a in a built-in memory 35a.

<Outdoor Unit>

The outdoor unit 2 is installed outside of a building and the like, and is connected to the connection units 4a and 4b and the indoor unit 3c via the first refrigerant communication pipe group 5, configuring the refrigerant circuit 10.

Next, the configuration of the outdoor unit 2 is described. The outdoor unit 2 mainly includes an outdoor side refrigerant circuit 20 that configures a part of the refrigerant circuit 10. This outdoor side refrigerant circuit 20 mainly includes a compressor 21, a four-way switching valve V1, an outdoor heat exchanger 22 as a heat source side heat exchanger, an outdoor expansion valve V2 as an expansion mechanism, an accumulator 23, a subcooler 24 as a temperature adjustment mechanism, a first bypass refrigerant circuit 27, a pressure reducing circuit 28, a liquid side stop valve V4, and a high pressure gas side stop valve V5, a low pressure gas side stop valve V6, and a first high pressure gas on/off valve V8.

The compressor 21 is a compressor whose operation capacity can be varied, and in the present embodiment, is a positive displacement-type compressor driven by a motor 21a whose rotation frequency Rm is controlled by an inverter. In the present embodiment, only one compressor 21 is provided, but it is not limited thereto, and two or more compressors may be connected in parallel according to the number of connected units of indoor units and the like.

The four-way switching valve V1 is a valve provided for causing the outdoor heat exchanger 22 to function as an evaporator and a condenser. The four-way switching valve V1 is connected to the refrigerant gas side of the outdoor heat exchanger 22, the accumulator 23 on the suction side of the compressor 21, the discharge side of the compressor 21, and the pressure reducing circuit 28. Additionally, when causing the outdoor heat exchanger 22 to function as a condenser, the discharge side of the compressor 21 is connected to the refrigerant gas side of the outdoor heat exchanger 22, and the accumulator 23 on the suction side of the compressor 21 is connected to the pressure reducing circuit 28. On the other hand, when causing the outdoor heat exchanger 22 to function as an evaporator, the refrigerant gas side of the outdoor heat exchanger 22 is connected to the accumulator 23 on the suction side of the compressor 21, and the discharge side of the compressor 21 is connected to the pressure reducing circuit 28.

The outdoor heat exchanger 22 is a heat exchanger capable of functioning as an evaporator for the refrigerant and also as a condenser for the refrigerant. In this embodiment, it is a fin-and-tube type heat exchanger of a cross fin system that exchanges heat with the refrigerant using air as a heat source. The gas side of the outdoor heat exchanger 22 is connected to the four-way switching valve V1, and the liquid side thereof is connected to the first liquid refrigerant communication pipe 51.

The outdoor expansion valve V2 is an electrically powered expansion valve connected to the liquid side of the outdoor heat exchanger 22 in order to adjust the pressure, flow rate, or the like of the refrigerant flowing in the outdoor side refrigerant circuit 20.

In addition, the outdoor unit 2 includes an outdoor fan 25 as a ventilation fan for sucking outdoor air into the unit, causing the air to exchange heat with the refrigerant in the outdoor heat exchanger 22, and then exhausting the air to the outside. The outdoor fan 25 is a fan capable of varying an air flow rate Wo of the air which is supplied to the outdoor heat exchanger 22, and in the present embodiment, is a propeller fan or the like driven by a motor 25a comprising a DC fan motor.

The accumulator 23 is connected between the four-way switching valve V1 and the compressor 21, and is a container capable of accumulating excess refrigerant generated in the refrigerant circuit 10 in accordance with the change in the operation load of the indoor units 3a to 3c and the like. In addition, the accumulator 23 is connected to the connection units 4a and 4b via the low pressure gas side stop valve V6 and the low pressure gas refrigerant communication pipe 53.

In the present embodiment, the subcooler 24 is a double tube heat exchanger, and is disposed to cool the refrigerant sent to the indoor expansion valves V9a to V9c after the refrigerant is condensed in the outdoor heat exchanger 22. The subcooler 24 is connected between the outdoor expansion valve V2 and the liquid side stop valve V4.

In addition, a second bypass refrigerant circuit 6 as a cooling source of the subcooler 24 is disposed. Note that, in the description below, a portion corresponding to the refrigerant circuit 10 excluding the second bypass refrigerant circuit 6 is referred to as a main refrigerant circuit for convenience sake.

The second bypass refrigerant circuit 6 is connected to the main refrigerant circuit so as to cause a portion of the refrigerant sent from the outdoor heat exchanger 22 to the indoor expansion valves V9a to V9c via the connection units 4a and 4b to branch from the main refrigerant circuit and return to the suction side of the compressor 21. Specifically, the second bypass refrigerant circuit 6 includes a branch circuit 61 connected so as to branch a portion of the refrigerant sent from the outdoor expansion valve V2 to the indoor expansion valves V9a to V9c via the connection units 4a and 4b at a position between the outdoor heat exchanger 22 and the subcooler 24, and a merging circuit 62 connected to the suction side of the compressor 21 so as to return a portion of refrigerant from an outlet on the second bypass refrigerant circuit 6 side of the subcooler 24 to the suction side of the compressor 21. Further, the branch circuit 61 is disposed with a bypass expansion valve V7 for adjusting the flow rate of the refrigerant flowing in the second bypass refrigerant circuit 6. Here, the bypass expansion valve V7 comprises an electrically operated expansion valve. In this way, the refrigerant sent from the outdoor heat exchanger 22 to the indoor expansion valves V9a to V9c via the connection units 4a and 4b is cooled in the subcooler 24 by the refrigerant flowing in the second bypass refrigerant circuit 6 which has been depressurized by the bypass expansion valve V7. In other words, performance of the subcooler 24 is controlled by adjusting the opening degree of the bypass expansion valve V7.

The first bypass refrigerant circuit 27 is a circuit that bypasses the pipe between the high pressure gas side stop valve V5 and the discharge side of the compressor 21 to the pipe between the low pressure gas side stop valve V6 and the accumulator 23. A first bypass on/off valve V3 is provided in the first bypass refrigerant circuit 27. Here, the first bypass on/off valve V3 is a solenoid valve capable of distributing and blocking the refrigerant.

The pressure reducing circuit 28 includes a capillary tube C1 and is connected to the four-way switching valve V1 and the accumulator 23.

The liquid side stop valve V4, the high pressure gas side stop valve V5, and the low pressure gas side stop valve V6 are valves disposed at ports connected to external equipment and pipes (specifically, the first liquid refrigerant communication pipe 51, the high pressure gas refrigerant communication pipe 52, and the low pressure gas refrigerant communication pipe 53). The liquid side stop valve V4 is connected to the outdoor heat exchanger 22 via the subcooler 24 and the outdoor expansion valve V2. The high pressure gas side stop valve V5 is connected to the discharge side of the compressor 21. The low pressure gas side stop valve V6 is connected to the suction side of the compressor 21 via the accumulator 23.

The first high pressure gas on/off valve V8 is provided on the pipe on the high pressure gas side which is branched from the discharge side of the compressor 21, and is a solenoid valve capable of distributing and blocking the high pressure gas refrigerant through the high pressure gas refrigerant communication pipe 52.

In addition, various sensors are disposed in the outdoor unit 2. Specifically, disposed in the outdoor unit 2 are a suction pressure sensor P1 that detects a suction pressure Ps of the compressor 21, a discharge pressure sensor P2 that detects a discharge pressure Pd of the compressor 21, a suction temperature sensor T1 that detects a suction temperature Ts of the compressor 21, and a discharge temperature sensor T2 that detects a discharge temperature Td of the compressor 21. The suction temperature sensor T1 is disposed at a position between the accumulator 23 and the compressor 21. The outdoor heat exchanger 22 is provided with a heat exchanger temperature sensor T3 that detects the temperature of the refrigerant flowing through the outdoor heat exchanger 22 (i.e., the refrigerant temperature corresponding to the condensation temperature Tc during the cooling operation or the evaporation temperature Te during the heating operation). A liquid side temperature sensor T4 that detects a refrigerant temperature Tco is disposed at the liquid side of the outdoor heat exchanger 22. A liquid pipe temperature sensor T5 that detects the temperature of the refrigerant (i.e., a liquid pipe temperature Tlp) is disposed at the outlet on the main refrigerant circuit side of the subcooler 24. An outdoor temperature sensor T6 that detects the temperature of outdoor air that flows into the unit (i.e., an outdoor temperature Ta) is disposed at the outdoor air suction side of the outdoor unit 2. The merging circuit 62 of the second bypass refrigerant circuit 6 is disposed with a bypass temperature sensor T7 for detecting the refrigerant temperature flowing at the outlet on the second bypass refrigerant circuit 6 side of the subcooler 24. A first high pressure gas pipe temperature sensor T8 that detects the temperature of the refrigerant (i.e., a first high pressure gas pipe temperature Th1) is provided to the high pressure gas pipe extending from the high pressure gas side stop valve V5 to the first high pressure gas on/off valve V8. In the present embodiment, the suction temperature sensor T1, the discharge temperature sensor T2, the heat exchanger temperature sensor T3, the liquid side temperature sensor T4, the liquid pipe temperature sensor T5, the outdoor temperature sensor T6, the bypass temperature sensor T7, and the first high pressure gas pipe temperature sensor T8 comprise thermistors.

In addition, the outdoor unit 2 includes an outdoor side controller 26 that controls the operation of each portion constituting the outdoor unit 2. Additionally, the outdoor side controller 26 includes a microcomputer and a memory disposed in order to control the outdoor unit 2, an inverter circuit that controls the motor 21a, and the like, and is configured such that it can exchange control signals and the like with the indoor side controllers 34a to 34c of the indoor units 3a to 3c and connection side controllers 44a and 44b of the connection units 4a and 4b (described later) via the transmission line 81. In other words, a controller 8 that performs the operation control of the entire air conditioner 1 is configured by the indoor side controllers 34a to 34c, the connection side controllers 44a and 44b, the outdoor side controller 26, and the transmission line 81 that interconnects each of these controllers.

Figure 2:
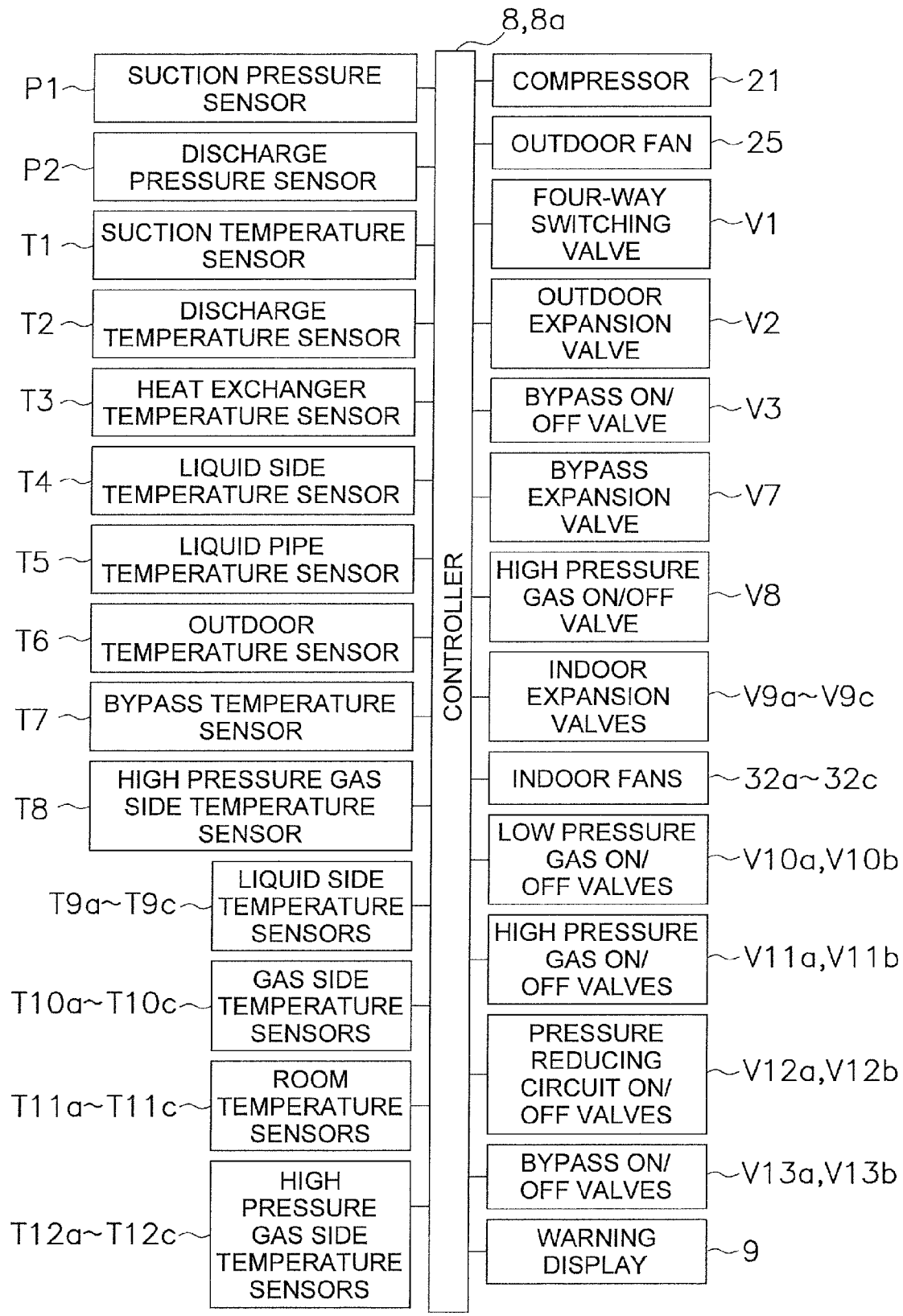
FIG. 2 is a control block diagram of the air conditioner.

As shown in FIG. 2, the controller 8 is connected so as to be able to receive detection signals of various sensors P1, P2, T1 to T8, T9a to T9c, T10a to T10c, T11a to T11c, T12a, and Tl2b and also to be able to control various equipment and valves 21, 25, 32a to 32c, V1 to V3, V7, V8, V9a to V9c, V10a, V10b, V11a, V11b, V12a, V12b, V13a, and V13b based on these detection signals and the like. In addition, a warning display 9 comprising LEDs and the like, which is configured to indicate that a refrigerant leak is detected in the below described refrigerant leak detection operation, is connected to the controller 8. Here, FIG. 2 is a control block diagram of the air conditioner 1.

<Connection Unit>

The connection units 4a and 4b are installed with the indoor units 3a and 3b in the room of a building or the like. The connection units 4a and 4b are interposed, together with the first refrigerant communication pipe group 5 and the second refrigerant communication pipe group 7, between the indoor units 3a and 3b and the outdoor unit 2, and configure a part of the refrigerant circuit 10.

Next, the configurations of the connection units 4a and 4b are described. Note that, because the connection units 4a and 4b have the same configuration, only the configuration of the connection unit 4a is described here, and in regard to the configuration of the connection unit 4b, reference symbols Yb and Yc are used instead of reference symbols Ya representing the respective portions of the connection unit 4a, and descriptions of those respective portions are omitted. For example, a subcooler 41a of the connection unit 4a corresponds to subcooler 41b of the connection unit 4b.

The connection unit 4a configures a part of the refrigerant circuit 10 and is provided with a connection side refrigerant circuit 40a. The connection side refrigerant circuit 40a mainly includes the subcooler 41a, a pressure reducing circuit 42a, a third bypass refrigerant circuit 43a, the low pressure gas on/off valve V10a, and the second high pressure gas on/off valve V11a.

The subcooler 41a is a device in which a portion of the liquid refrigerant to be returned to the first liquid refrigerant communication pipe 51 is sent to the subcooler 41a via the pressure reducing circuit 42a (described later) so as to subcool the liquid refrigerant to be returned to the first liquid refrigerant communication pipe 51 when the indoor units 3a and 3b perform the simultaneous cooling and heating operation. A portion of the liquid refrigerant introduced into the subcooler 41a evaporates as a result of heat exchange, and is returned to the outdoor side refrigerant circuit 20 through the low pressure gas refrigerant communication pipe 53. The pressure reducing circuit 42a has a pressure reducing circuit on/off valve V12a and a capillary tube C2a which are connected in series.

The third bypass refrigerant circuit 43a is a circuit that bypasses the high pressure gas refrigerant communication pipe 52 to the low pressure gas refrigerant communication pipe 53. A second bypass on/off valve V13a is provided in the third bypass refrigerant circuit 43a. Here, the second bypass on/off valve V13a is a solenoid valve capable of distributing and blocking the refrigerant.

The low pressure gas on/off valve V10a is connected to the low pressure gas refrigerant communication pipe 53, and is a solenoid valve capable of distributing and blocking the refrigerant.

The second high pressure gas on/off valve V11a is connected to the high pressure gas refrigerant communication pipe 52, and is a solenoid valve capable of distributing and blocking the refrigerant.

The connection unit 4a sets the low pressure gas on/off valve V10a to an opened state and closes the second high pressure gas on/off valve V11a when the indoor unit 3a performs the cooling operation. Accordingly, the connection unit 4a can function to send the liquid refrigerant that flows in from the first liquid refrigerant communication pipe 51 to the indoor expansion valve V9a of the indoor side refrigerant circuit 30a and to return the gas refrigerant that is depressurized in the indoor expansion valve V9a and evaporated in the indoor heat exchanger 31a to the low pressure gas refrigerant communication pipe 53.

In addition, the connection unit 4a closes the low pressure gas on/off valve V10a and sets the second high pressure gas on/off valve V11a to an opened state when the indoor unit 3a performs the heating operation. Accordingly, the connection unit 4a can function to send the high pressure gas refrigerant that flows in from the high pressure gas refrigerant communication pipe 52 to the gas side of the indoor heat exchanger 31a in the indoor side refrigerant circuit 30a and to return the liquid refrigerant condensed in the indoor heat exchanger 31a to the first liquid refrigerant communication pipe 51.

In addition, the connection unit 4a is provided with a second high pressure gas pipe temperature sensor T12a that detects the temperature of the refrigerant (i.e., a second high pressure gas pipe temperature Th2) in the high pressure gas refrigerant flow path. In the present embodiment, the second high pressure gas pipe temperature sensor T12a comprises a thermistor.

Further, the connection unit 4a includes a connection side controller 44a that controls the operation of each portion constituting the connection unit 4a. Additionally, the connection side controller 44a includes a microcomputer and a memory disposed in order to control the indoor unit 4a, and is configured such that it can exchange control signals and the like with the indoor side controller 34a of the indoor unit 3a.

As described above, the outdoor side refrigerant circuit 20 is connected to the indoor side refrigerant circuits 30a and 30b via the connection side refrigerant circuits 40a and 40b, and is also connected to the indoor side refrigerant circuit 30c, thereby configuring the refrigerant circuit 10 of the air conditioner 1. Additionally, the air conditioner 1 in the present embodiment can performs the so-called simultaneous cooling and heating operation where, for example, the indoor unit 3c performs the cooling operation while the indoor units 3a and 3b perform the heating operation, and the like.

<First Refrigerant Communication Pipe Group and Second Refrigerant Communication Pipe Group>

The first refrigerant communication pipe group 5 and the second refrigerant communication pipe group 7 are refrigerant pipes that are arranged on site when installing the air conditioner 1 at an installation location such as a building and the like. Pipes having various lengths and pipe diameters are used according to the installation conditions such as an installation location, combination of an outdoor unit, an indoor unit, and a connection unit, and the like. Accordingly, for example, when installing a new air conditioner 1, in order to calculate the charging quantity of the refrigerant, it is necessary to obtain accurate information regarding the lengths and pipe diameters and the like of the first refrigerant communication pipe group 5 and the second refrigerant communication pipe group 7. However, management of such information and the calculation itself of the refrigerant quantity are difficult. In addition, when utilizing an existing pipe to renew an indoor unit, an outdoor unit, or a connection unit, there is a case where information regarding the lengths and pipe diameters and the like of the first refrigerant communication pipe group 5 and the second refrigerant communication pipe group 7 has been lost.

As described above, the refrigerant circuit 10 of the air conditioner 1 is configured by the interconnection of the indoor side refrigerant circuits 30a to 30c, the outdoor side refrigerant circuit 20, the connection side refrigerant circuits 40a and 40b, the first refrigerant communication pipe group 5, and the second refrigerant communication pipe group 7. In addition, it can also be said that this refrigerant circuit 10 is configured by the second bypass refrigerant circuit 6 and the main refrigerant circuit excluding the second bypass refrigerant circuit 6. Additionally, the controller 8 constituted by the indoor side controllers 34a to 34c, the connection side controllers 44a and 44b, and the outdoor side controller 26 allows the air conditioner 1 in the present embodiment to operate the cooling operation and the simultaneous cooling and heating operation by switching therebetween by the four-way switching valve V1 and the first high pressure on/off valve V8 in the outdoor unit 2 and the low pressure gas on/off valve V10a and the second high pressure gas on/off valve V11a in the connection units 4a and 4b, and also to control each equipment of the outdoor unit 2, the indoor units 3a to 3c, and the connection units 4a and 4b according to the operation load of each of the indoor units 3a to 3c.

(2) Operation of the Air Conditioner

Next, the operation of the air conditioner 1 in the present embodiment is described.

The operation modes of the air conditioner 1 in the present embodiment include: a normal operation mode where control of constituent equipment of the outdoor unit 2, the indoor units 3a to 3c, and the connection units 4a and 4b is performed according to the operation load of each of the indoor units 3a to 3c; a test operation mode where a test operation to be performed after installation of constituent equipment of the air conditioner 1 is performed (specifically, it is not limited to after the first-time installation of equipment: it also includes, for example, after modification by adding or removing constituent equipment such as an indoor unit, after repair of damaged equipment, and the like); and a refrigerant leak detection operation mode where, after the test operation is finished and the normal operation has started, whether or not the refrigerant is leaking from the refrigerant circuit 10 is judged.

The normal operation mode mainly includes the following operations according to the cooling and heating load of the indoor units 3a to 3c: the cooling operation where all the indoor units 3a to 3c perform cooling; and the simultaneous cooling and heating operation where one or some of the indoor units 3a to 3c perform cooling and the other indoor unit(s) performs heating. In addition, according to the air-conditioning load of the entire indoor units 3a to 3c, the simultaneous cooling and heating operation can be divided into a case where the operation is performed by causing the outdoor heat exchanger 22 of the outdoor unit 2 to function as an evaporator (evaporation operation state), and a case where the operation is performed by causing the outdoor heat exchanger 22 of the outdoor unit 2 to function as a condenser (condensation operation state). Note that, the simultaneous cooling and heating operation described here specifically refers to, for example, an operation where the indoor unit 3a performs the heating operation and the other indoor units 3b and 3c perform the cooling operation.

In addition, the test operation mode mainly includes an automatic refrigerant charging operation to charge refrigerant into the refrigerant circuit 10; a pipe volume judging operation to detect the volumes of the first refrigerant communication pipe group 5 and the second refrigerant communication pipe group 7; and an initial refrigerant quantity detection operation to detect the initial refrigerant quantity after installing constituent equipment or after charging refrigerant into the refrigerant circuit 10.

Operation in each operation mode of the air conditioner 1 is described below.

<Normal Operation Mode>

(Cooling Operation)

First, the cooling operation in the normal operation mode is described with reference to FIGS. 1 and 2.

During the cooling operation, in the outdoor side refrigerant circuit 20 of the outdoor unit 2, the four-way switching valve V1 is switched to a state indicated by solid lines in FIG. 1, and thereby the outdoor heat exchanger 22 is caused to function as a condenser. The outdoor expansion valve V2 is in a fully opened state. The liquid side stop valve V4, the high pressure gas side stop valve V5, and the low pressure gas side stop valve V6 are set to an opened state, and the first high pressure gas on/off valve V8 is set to a closed state.

In the indoor units 3a to 3c, the opening degree of each of the indoor expansion valves V9a to V9c is adjusted such that a superheating degree SHr of the refrigerant at the outlet of each of the indoor heat exchangers 31a to 31c (i.e., the gas sides of the indoor heat exchangers 31a to 31c) becomes constant at a target superheating degree SHrs. In the present embodiment, the superheating degree SHr of the refrigerant at the outlet of each of the indoor heat exchangers 31a to 31c is detected by subtracting the refrigerant temperature (which corresponds to the evaporation temperature Te) detected by the liquid side temperature sensors T9a to T9c from the refrigerant temperature detected by the gas side temperature sensors T10a to T10c, or is detected by converting the suction pressure Ps of the compressor 21 detected by the suction pressure sensor P1 to saturation temperature corresponding to the evaporation temperature Te, and subtracting this saturation temperature of the refrigerant from the refrigerant temperature detected by the gas side temperature sensors T10a to T10c. Note that, although it is not employed in the present embodiment, a temperature sensor that detects the temperature of the refrigerant flowing through each of the indoor heat exchangers 31a to 31c may be disposed such that the superheating degree SHr of the refrigerant at the outlet of each of the indoor heat exchangers 31a to 31c is detected by subtracting the refrigerant temperature corresponding to the evaporation temperature Te which is detected by this temperature sensor from the refrigerant temperature detected by the gas side temperature sensors T10a to T10c.

In addition, the opening degree of the bypass expansion valve V7 is adjusted such that a superheating degree SHb of the refrigerant at the outlet on the second bypass refrigerant circuit 6 side of the subcooler 24 becomes a target superheating degree SHbs. In the present embodiment, the superheating degree SHb of the refrigerant at the outlet on the second bypass refrigerant circuit 6 side of the subcooler 24 is detected by converting the suction pressure Ps of the compressor 21 detected by the suction pressure sensor P1 to saturation temperature corresponding to the evaporation temperature Te, and subtracting this saturation temperature of the refrigerant from the refrigerant temperature detected by the bypass temperature sensor T7. Note that, although it is not employed in the present embodiment, a temperature sensor may be disposed at an inlet on the second bypass refrigerant circuit 6 side of the subcooler 24 such that the superheating degree SHb of the refrigerant at the outlet on the second bypass refrigerant circuit 6 side of the subcooler 24 is detected by subtracting the refrigerant temperature detected by this temperature sensor from the refrigerant temperature detected by the bypass temperature sensor T7.

In the connection units 4a and 4b, the second high pressure gas on/off valves V11a and V11b are closed and at the same time the low pressure gas on/off valves V10a and V10b are opened. Thereby, the indoor heat exchangers 31a to 31c of the indoor units 3a to 3c will function as evaporators and at the same time a state is achieved where the indoor heat exchangers 31a to 31c of the indoor units 3a to 3c are connected to the suction side of the compressor 21 of the outdoor unit 2 via the low pressure gas refrigerant communication pipe 53. In addition, the pressure reducing circuit on/off valves V12a and V12b are in a closed state.

When the compressor 21, the outdoor fan 25, and the indoor fans 32a to 32c are started in this state of the refrigerant circuit 10, the low pressure gas refrigerant is sucked into the compressor 21 and compressed into high pressure gas refrigerant. Subsequently, the high pressure gas refrigerant is sent to the outdoor heat exchanger 22 via the four-way switching valve V1, exchanges heat with the outdoor air supplied by the outdoor fan 25, and becomes condensed into high pressure liquid refrigerant. Then, this high pressure liquid refrigerant passes through the outdoor expansion valve V2, flows into the subcooler 24, exchanges heat with the refrigerant flowing in the second bypass refrigerant circuit 6, is further cooled, and becomes subcooled. At this time, a portion of the high pressure liquid refrigerant condensed in the outdoor heat exchanger 22 is branched into the second bypass refrigerant circuit 6 and is depressurized by the bypass expansion valve V7. Subsequently, it is returned to the suction side of the compressor 21. Here, the refrigerant that passes through the bypass expansion valve V7 is depressurized close to the suction pressure Ps of the compressor 21 and thereby a portion of the refrigerant evaporates. Then, the refrigerant flowing from the outlet of the bypass expansion valve V7 of the second bypass refrigerant circuit 6 toward the suction side of the compressor 21 passes through the subcooler 24 and exchanges heat with high pressure liquid refrigerant sent from the outdoor heat exchanger 22 on the main refrigerant circuit side to the indoor units 3a to 3c.

Then, the high pressure liquid refrigerant in a subcooled state is sent to the indoor units 3a to 3c via the liquid side stop valve V4 and the first liquid refrigerant communication pipe 51. The high pressure liquid refrigerant sent to the indoor units 3a to 3c is depressurized close to the suction pressure Ps of the compressor 21 by the indoor expansion valves V9a to V9c, becomes refrigerant in a low pressure gas-liquid two-phase state, is sent to the indoor heat exchangers 31a to 31c, exchanges heat with the indoor air in the indoor heat exchangers 31a to 31c, and is evaporated into low pressure gas refrigerant.

Then, the low pressure gas refrigerant evaporated in the indoor heat exchangers 31a and 31b is sent to the low pressure gas refrigerant communication pipe 53 through the low pressure gas on/off valves V10a and V10b of the connection units 4a and 4b, and the low pressure gas refrigerant evaporated in the indoor heat exchanger 31c is sent straight to the low pressure gas refrigerant communication pipe 53. This low pressure gas refrigerant is sent to the outdoor unit 2 via the low pressure gas refrigerant communication pipe 53, and flows into the accumulator 23 via the low pressure gas side stop valve V6. The low pressure gas refrigerant that flowed into the accumulator 23 is again sucked into the compressor 21.

In the present embodiment, the indoor unit 3c is performing the cooling operation at all times according to the cooling load of the machine room. Here, the indoor side controller 34c periodically records, in a built-in memory 35c, a target superheating degree SHrcs of the refrigerant at the outlet of the indoor heat exchanger 31c.

(Simultaneous Cooling and Heating Operation/Evaporation Load)

An operation (evaporation operation) is described which is the simultaneous cooling and heating operation where, for example, among the indoor units 3a to 3c, the indoor units 3a and 3b perform the heating operation and at the same time the indoor unit 3c performs the cooling operation, and in which the outdoor heat exchanger 22 of the outdoor unit 2 is caused to function as an evaporator according to the air conditioning load of the entire indoor units 3a to 3c. At this time, the four-way switching valve V1 is switched to a state indicated by dotted lines in FIG. 1. Thereby the outdoor heat exchanger 22 functions as an evaporator and also the high pressure gas refrigerant compressed in and discharged from the compressor 21 is supplied to the two indoor units 3a and 3b performing the heating operation through the high pressure gas refrigerant communication pipe 52. At this time, the bypass expansion valve V7 is closed, and the first high pressure gas on/off valve V8 is set to an opened state.

In addition, in the indoor units 3a and 3b, the opening degree of each of the indoor expansion valves V9a and V9b is adjusted such that the subcooling degree SCr of the refrigerant at the outlet of each of the indoor heat exchangers 31a and 31b (i.e., the liquid sides of the indoor heat exchangers 31a and 31b) becomes constant at the target subcooling degree SCrs.

In the connection units 4a and 4b, the low pressure gas on/off valves V10a and V10b are closed and at the same time the second high pressure gas on/off valves V11a and V11b are opened. Thereby the indoor heat exchangers 31a and 31b of the indoor units 3ab and 3b are brought into a state where they function as condensers. In addition, the pressure reducing circuit on/off valves V12a and V12b are in an opened state.

In the indoor unit 3c, the opening degree of each of the indoor expansion valve V9c is adjusted according to the cooling load of each of the indoor unit 3c. For example, adjustment of the opening degree is performed based on the superheating degree of the indoor heat exchanger 31c (specifically, the temperature difference between the refrigerant temperature detected by the liquid side temperature sensor T9c and the refrigerant temperature detected by the gas side temperature sensor T10c).

In this state of the refrigerant circuit 10, the high pressure gas refrigerant compressed in and discharged from the compressor 21 is sent to the high pressure gas refrigerant communication pipe 52 through the high pressure gas side stop valve V5.

Then, the high pressure gas refrigerant sent to the high pressure gas refrigerant communication pipe 52 is sent to each of the indoor units 3a and 3b through each of the connection units 4a and 4b and the second high pressure gas on/off valves V11a and V11b. Then, the high pressure gas refrigerant sent to the indoor units 3a and 3b exchanges heat with the indoor air in the indoor heat exchangers 31a and 31b and is condensed into high pressure liquid refrigerant. Subsequently, it is depressurized according to the opening degree of the indoor expansion valves V9a and V9b when passing through the indoor expansion valves V9a and V9b. On the other hand, the indoor air is heated and supplied to the room.

The refrigerant that passed through the indoor expansion valves V9a and V9b is sent to the subcoolers 41a and 41b of the connection units 4a and 4b and is subcooled. This subcooled liquid refrigerant is sent to the first liquid refrigerant communication pipe 51, and a portion of the liquid refrigerant sent to the first liquid refrigerant communication pipe 51 is sent to the indoor expansion valve V9c of the indoor unit 3c.

The refrigerant sent to the indoor expansion valve V9c is depressurized by the indoor expansion valve V9c. Thereafter, the refrigerant exchanges heat with the indoor air in the indoor heat exchangers 3 and is thereby evaporated into low pressure gas refrigerant. On the other hand, the indoor air is cooled and supplied to the room. Then, the low pressure gas refrigerant is sent to the outdoor unit 2 through the low pressure gas refrigerant communication pipe 53, and flows into the accumulator 23 via the low pressure gas side stop valve V6. Then, the low pressure gas refrigerant that flowed into the accumulator 23 is again sucked into the compressor 21.

On the other hand, the remaining portion of the refrigerant from which the refrigerant sent from the first liquid refrigerant communication pipe 51 to the indoor unit 3c is excluded is sent to the outdoor heat exchanger 22 via the liquid side stop valve V4 of the outdoor unit 2, and is evaporated in the outdoor heat exchanger 22, thereby becoming low pressure gas refrigerant. This gas refrigerant is sucked into the compressor 21 via the four-way switching valve V1 and the accumulator 23.

In the present embodiment, also in the case of the simultaneous cooling and heating operation (evaporation load), the indoor unit 3c is performing the cooling operation at all times according to the cooling load of the machine room. Here, the indoor side controller 34c periodically records, in the built-in memory 35c, the target superheating degree SHres of the refrigerant at the outlet of the indoor heat exchanger 31c, as in the case of the cooling operation.

(Simultaneous Cooling and Heating Operation/Condensation Load)

An operation (condensation operation) is described which is the simultaneous cooling and heating operation mode where, for example, among the indoor units 3a to 3c, the indoor unit 3a performs the heating operation and at the same time the indoor units 3b and 3c perform the cooling operation, and in which the outdoor heat exchanger 22 of the outdoor unit 2 is caused to function as a condenser according to the air conditioning load of the entire indoor units 3a to 3c. At this time, the four-way switching valve V1 is switched to a state indicated by solid lines in FIG. 1. Thereby the outdoor heat exchanger 22 functions as a condenser and also the high pressure gas refrigerant compressed in and discharged from the compressor 21 is supplied to the indoor unit 3a through the high pressure gas refrigerant communication pipe 52. At this time, the first high pressure gas on/off valve V8 is set to an opened state.

In the indoor unit 3a, the opening degree of the indoor expansion valve V9a is adjusted according to the heating load of each of the indoor unit 3a. The opening degree is adjusted, for example, based on the subcooling degree of the indoor heat exchanger 31a (specifically, the temperature difference between the refrigerant temperature detected by the liquid side temperature sensor T9a and the refrigerant temperature detected by the gas side temperature sensor T10a).

In the connection unit 4a, the low pressure gas on/off valve V10a is closed and at the same time the second high pressure gas on/off valve V11a is opened. Thereby, the indoor heat exchanger 31a of the indoor unit 3a is caused to function as a condenser. In addition, the pressure reducing circuit on/off valve V12a is in an opened state.

In the indoor units 3b and 3c, the opening degree of each of the indoor expansion valves V9b and V9c is adjusted according to the cooling load of each of the indoor units 3b and 3c. The opening degree is adjusted, for example, based on the superheating degree of the indoor heat exchangers 31b and 31c (specifically, the temperature difference between the refrigerant temperature detected by the liquid side temperature sensors T9b and T9c and the refrigerant temperature detected by the gas side temperature sensors T10b and T10c).

In the connection unit 4b, the second high pressure gas on/off valve V11b is closed and at the same time the low pressure gas on/off valve V10b is opened. Thereby, the indoor heat exchanger 31b of the indoor unit 3b will function as an evaporator and at the same time a state is achieved where the indoor heat exchanger 31b of the indoor unit 3b is connected to the suction side of the compressor 21 of the outdoor unit 2 via the low pressure gas refrigerant communication pipe 53. In addition, the pressure reducing circuit on/off valve V12b is in a closed state.

In such a state of the refrigerant circuit 10, the high pressure gas refrigerant compressed in and discharged from the compressor 21 is sent to the outdoor heat exchanger 22 through the four-way switching valve V1 and is also sent to the high pressure gas refrigerant communication pipe 52 through the high pressure gas side stop valve V5.

The high pressure gas refrigerant sent to the outdoor heat exchanger 22 is condensed in the outdoor heat exchanger 22 and becomes liquid refrigerant. Then, the liquid refrigerant is sent to the first liquid refrigerant communication pipe 51 through the liquid side stop valve V4.

In addition, the high pressure gas refrigerant sent to the high pressure gas refrigerant communication pipe 52 is sent to the connection unit 4a. The high pressure gas refrigerant sent to the connection unit 4a is sent to the indoor heat exchanger 31a of the indoor unit 3a through the second high pressure gas on/off valve V11a.

The high pressure gas refrigerant sent to the indoor heat exchanger 31a exchanges heat with the indoor air in the indoor heat exchanger 31a of the indoor unit 3a and thereby is condensed. On the other hand, the indoor air is heated and supplied to the room. The refrigerant condensed in the indoor heat exchanger 31a passes through the indoor expansion valve V9a and then is sent to the connection unit 4a.

The refrigerant sent to the connection unit 4a is sent to the first liquid refrigerant communication pipe 51, and merges with the refrigerant that is sent to the first liquid refrigerant communication pipe 51 through the liquid side stop valve V4. The refrigerant that flows through the first liquid refrigerant communication pipe 51 is sent to the indoor expansion valves V9b and V9c of the indoor units 3b and 3c. Here, the refrigerant flows to the indoor expansion valve V9b via the connection unit 4b.

The refrigerant sent to the indoor expansion valves V9b and V9c is depressurized by the indoor expansion valves V9b and V9c. Then, the refrigerant evaporates as a result of heat exchange with the indoor air in the indoor heat exchangers 31b and 31c and becomes low pressure gas refrigerant. On the other hand, the indoor air is cooled and supplied to the room. Then, the low pressure gas refrigerant that has undergone heat exchange in the indoor heat exchanger 31b is sent to the connection unit 4b. In addition, the low pressure gas refrigerant that has undergone heat exchange in the indoor heat exchanger 31c is sent to the low pressure gas refrigerant communication pipe 53.

The low pressure gas refrigerant sent to the connection unit 4b is sent to the low pressure gas refrigerant communication pipe 53 through the low pressure gas on/off valve V10b, and merges with the low pressure gas refrigerant that has undergone heat exchange in the indoor heat exchanger 31c. The merged low pressure gas refrigerant is sucked into the compressor 21 via the low pressure gas side stop valve V6 and the accumulator 23.

Such operation control as described above in the normal operation mode is performed by the controller 8 (more specifically, the indoor side controllers 34a to 34c, the connection side controllers 44a and 44b, the outdoor side controller 26, and the transmission line 81 that interconnects each of the controllers 34a to 34c, 44a and 44b, and 26) that functions as a normal operation controlling means to perform the normal operation that includes the cooling operation and the heating operation.

In the present embodiment, also in the case of the simultaneous cooling and heating operation (condensation load), the indoor unit 3c is performing the cooling operation at all times according to the cooling load of the machine room. Here, the indoor side controller 34c periodically records, in the built-in memory 35c, the target superheating degree SHrcs of the refrigerant at the outlet of the indoor heat exchanger 31c, as in the cases of the cooling operation and the simultaneous cooling and heating operation (evaporation load).

<Test Operation Mode>

Figure 3:
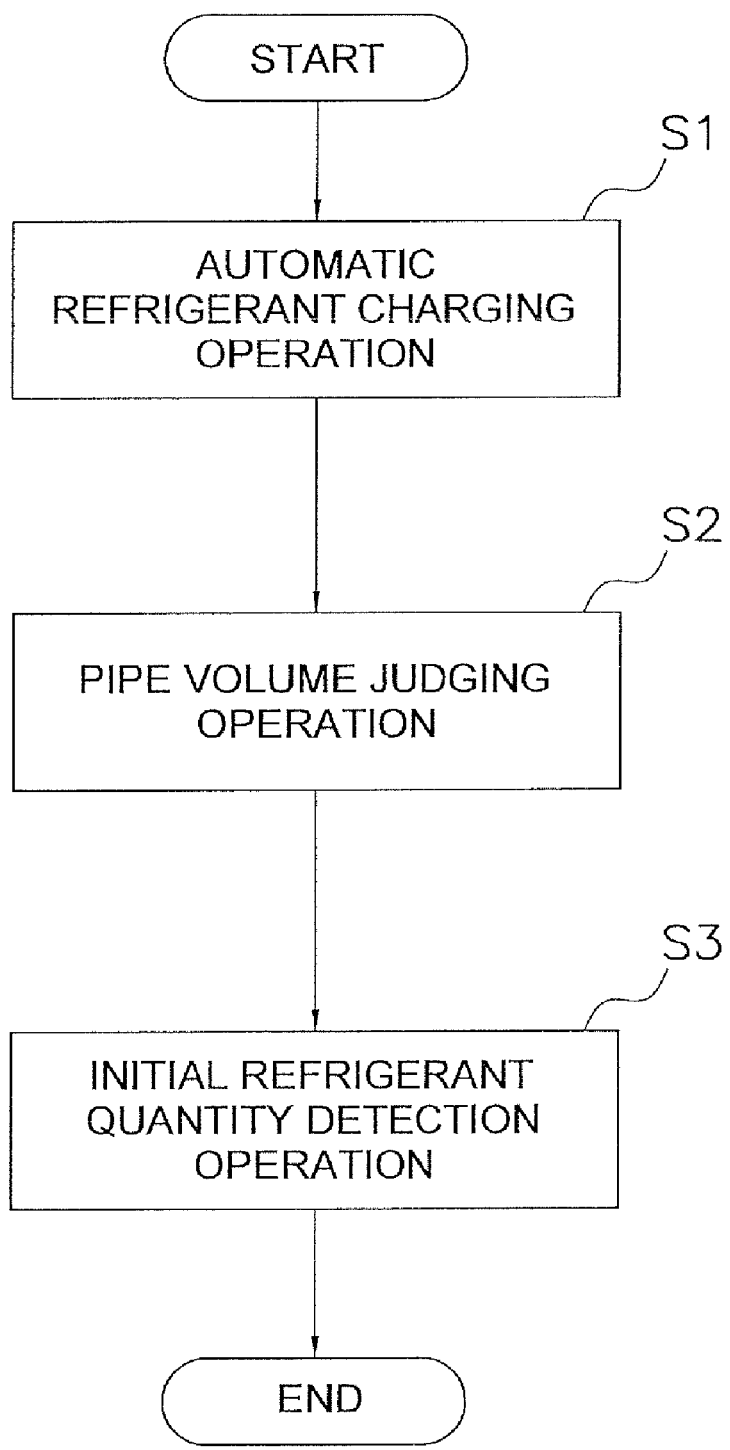
FIG. 3 is a flowchart of a test operation mode.

Next, the test operation mode is described with reference to FIGS. 1 to 3. Here, FIG. 3 is a flowchart of the test operation mode. In the present embodiment, in the test operation mode, first, the automatic refrigerant charging operation in Step S1 is performed. Subsequently, the pipe volume judging operation in Step S2 is performed, and then the initial refrigerant quantity detection operation in Step S3 is performed.

In the present embodiment, an example of a case is described where the outdoor unit 2 into which the refrigerant is charged in advance, the indoor units 3a to 3c, and the connection units 4a and 4b are installed at an installation location such as a building and the like and interconnected via the first refrigerant communication pipe group 5 and the second refrigerant communication pipe group 7 to configure the refrigerant circuit 10; and subsequently additional refrigerant is charged into the refrigerant circuit 10 whose refrigerant quantity is insufficient according to the volumes of the first refrigerant communication pipe group 5 and the second refrigerant communication pipe group 7.

(Step S1: Automatic Refrigerant Charging Operation)

First, the liquid side stop valve V4, the high pressure gas side stop valve V5, and the low pressure gas side stop valve V6 of the outdoor unit 2 are opened and the refrigerant circuit 10 is filled with the refrigerant that is charged in the outdoor unit 2 in advance.

Figure 4:
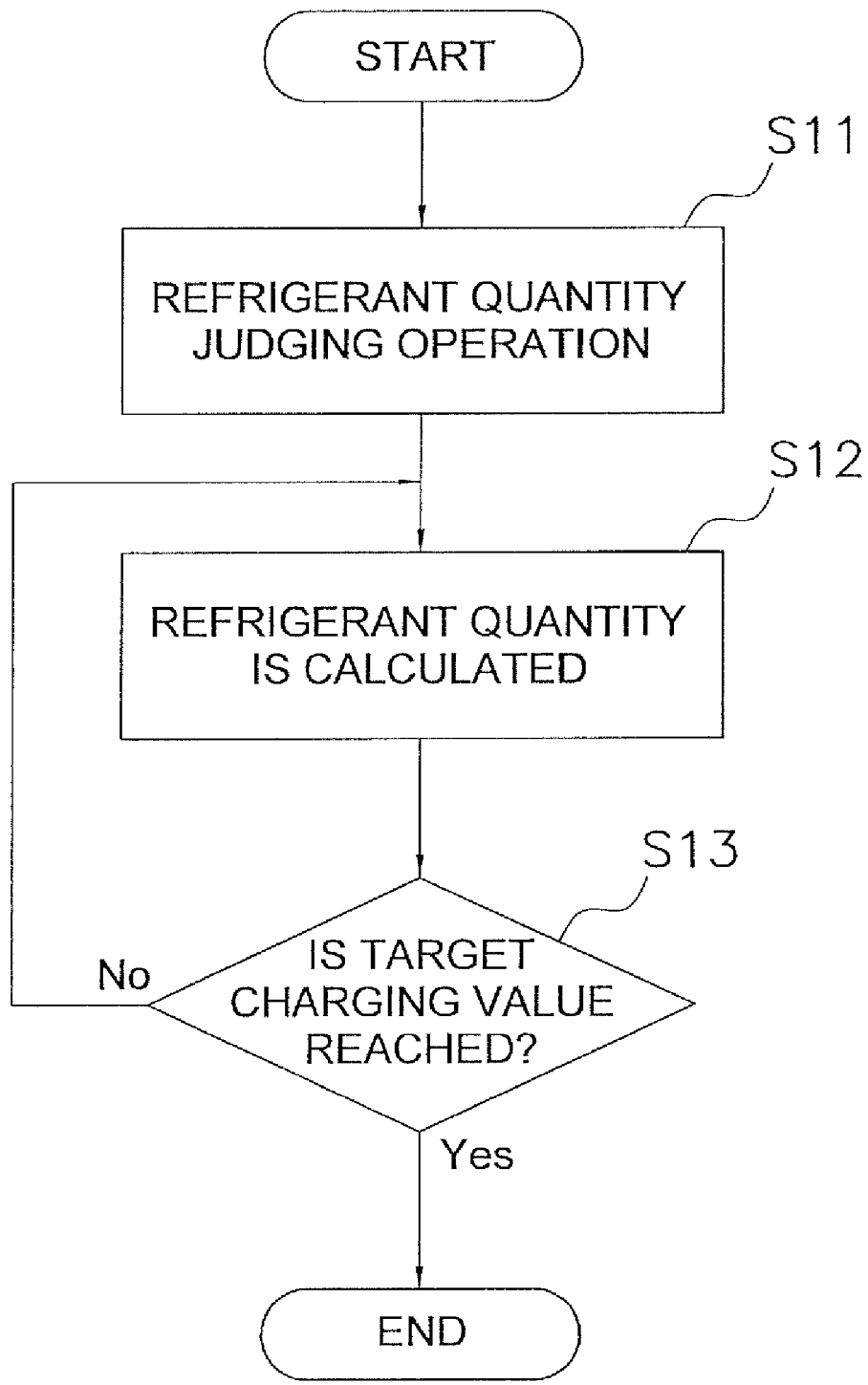
FIG. 4 is a flowchart of an automatic refrigerant charging operation.

Next, when a worker performing the test operation connects a refrigerant cylinder for additional charging to a service port (not shown) of the refrigerant circuit 10 and issues a command to start the test operation directly to the controller 8 or remotely by a remote controller (not shown) and the like, the controller 8 starts the process from Step S11 to Step S13 shown in FIG. 4. Here, FIG. 4 is a flowchart of the automatic refrigerant charging operation.

(Step S11: Refrigerant Quantity Judging Operation)

When a command to start the automatic refrigerant charging operation is issued, with the four-way switching valve V1 of the outdoor unit 2 in a state indicated by solid lines in FIG. 1, the refrigerant circuit 10 becomes a state where the indoor expansion valves V9a to V9c of the indoor units 3a to 3c, the low pressure gas on/off valves V10a and V10b of the connection units 4a and 4b, and the outdoor expansion valve V2 are opened, and the first high pressure gas on/off valve V8 of the outdoor unit 2 and the second high pressure gas on/off valves V11a and V11b of the connection units 4a and 4b are closed. Then, the compressor 21, the outdoor fan 25, and the indoor fans 32a to 32c are started, and all of the indoor units 3a to 3c are forcibly caused to perform the cooling operation (hereinafter referred to as "all indoor unit operation"). At this time, the first bypass on/off valve V3 in the first bypass refrigerant circuit 27 in the outdoor unit 2 and the second bypass on/off valves V13a and V13b in the third bypass refrigerant circuits 43a and 43b in the connection units 4a and 4b are in an opened state, and the pressure of the refrigerant in the high pressure gas refrigerant communication pipe 52 and in the low pressure gas refrigerant communication pipe 53 becomes equalized.

Figure 5:
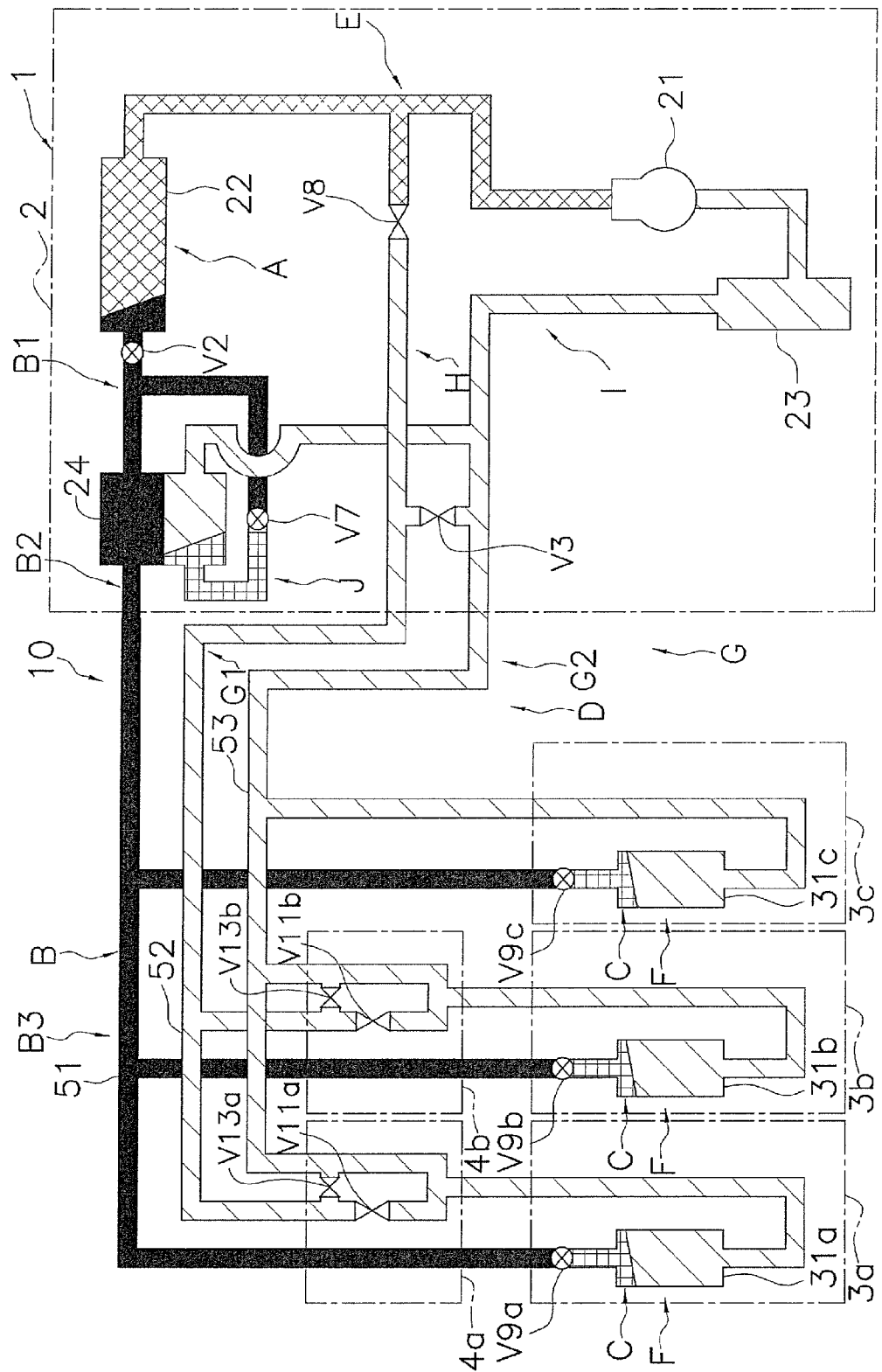
FIG. 5 is a schematic diagram to show a state of the refrigerant flowing in a refrigerant circuit in a refrigerant quantity judging operation (illustrations of a four-way switching valve and the like are omitted).

Consequently, as shown in FIG. 5, in the refrigerant circuit 10, the high pressure gas refrigerant compressed in and discharged from the compressor 21 flows along a flow path from the compressor 21 to the outdoor heat exchanger 22 that functions as a condenser (see the portion from the compressor 21 to the outdoor heat exchanger 22 in the area indicated by diagonal hatching in FIG. 5); the high pressure refrigerant that undergoes phase-change from a gas state to a liquid state by heat exchange with the outdoor air flows in the outdoor heat exchanger 22 that functions as a condenser (see the portion corresponding to the outdoor heat exchanger 22 in the area indicated by diagonal hatching and black hatching in FIG. 5); the high pressure liquid refrigerant flows along a flow path from the outdoor heat exchanger 22 to the indoor expansion valves V9a to V9c (including the outdoor expansion valve V2, the portion corresponding to the main refrigerant circuit side of the subcooler 24, and the first liquid refrigerant communication pipe 51) and a flow path from the outdoor heat exchanger 22 to the bypass expansion valve V7 (see the portions from the outdoor heat exchanger 22 to the indoor expansion valves V9a to V9c and to the bypass expansion valve V7 in the area indicated by black hatching in FIG. 5); the low pressure refrigerant that undergoes a phase change from a gas-liquid two-phase state to a gas state by heat exchange with the indoor air and the like flows in the portions corresponding to the indoor heat exchangers 31a to 31c that function as evaporators and the portion corresponding to the second bypass refrigerant circuit 6 side of the subcooler 24 (see the portions corresponding to the indoor heat exchangers 31a to 31c and the portion corresponding to the subcooler 24 in the area indicated by lattice hatching and diagonal hatching in FIG. 5); and, within a flow path from the indoor heat exchangers 31a to 31c to the compressor 21, the low pressure gas refrigerant flows along flow paths on the high pressure gas side and the low pressure gas side of the connection units 4a and 4b (including the third bypass refrigerant circuits 43a and 43b), a flow path including the high pressure gas refrigerant communication pipe 52, the low pressure gas refrigerant communication pipe 53, the first bypass refrigerant circuit 27, and the accumulator 23, and a flow path from the portion corresponding to the second bypass refrigerant circuit 6 side of the subcooler 24 to the compressor 21 (see the portion from the indoor heat exchangers 31a to 31c to the compressor 21 ((including the high pressure gas refrigerant communication pipe 52 and the low pressure gas refrigerant communication pipe 53 and the connection units 4a and 4b)) and the portion from the portion corresponding to the second bypass refrigerant circuit 6 side of the subcooler 24 to the compressor 21 in the area indicated by diagonal hatching in FIG. 5). FIG. 5 is a schematic diagram to show a state of the refrigerant flowing in the refrigerant circuit 10 in a refrigerant quantity judging operation (illustrations of the four-way switching valve V1 and the like are omitted).

Next, equipment control as described below is performed to proceed to operation to stabilize the state of the refrigerant circulating in the refrigerant circuit 10.

Control to stabilize the state of the refrigerant includes: superheating degree control to control each of the indoor expansion valves V9a to V9c such that the superheating degree SHr of the entire indoor heat exchangers that function as evaporators becomes constant; evaporation pressure control to control the operation capacity of the compressor 21 such that the evaporation pressure Pe becomes constant; condensation pressure control to control the air flow rate Wo of outdoor air supplied to the outdoor heat exchanger 22 by the outdoor fan 25 such that a condensation pressure Pc of the refrigerant in the outdoor heat exchanger 22 becomes constant; and liquid pipe temperature control to control the operation capacity of the subcooler 24 such that the temperature of the refrigerant sent from the subcooler 24 to the indoor expansion valves V9a to V9c becomes constant.

Here, the reason to perform the evaporation pressure control is because the evaporation pressure Pe of the refrigerant in the indoor heat exchangers 31a to 31c that function as evaporators is greatly affected by the refrigerant quantity in the indoor heat exchangers 31a to 31c where the low pressure refrigerant flows while undergoing a phase change from a gas-liquid two-phase state to a gas state as a result of heat exchange with the indoor air (see the portions corresponding to the indoor heat exchangers 31a to 31c in the area indicated by lattice hatching and diagonal hatching in FIG. 5, which is hereinafter referred to as "evaporator portion C"). Then, here, the state of the refrigerant flowing in the evaporator portion C is stabilized by causing the evaporation pressure Pe of the refrigerant in the indoor heat exchangers 31a to 31c to become constant as a result of controlling the operation capacity of the compressor 21 by the motor 21a whose rotation frequency Rm is controlled by an inverter. In other words, a state is created in which the refrigerant quantity in the evaporator portion C changes mainly by the evaporation pressure Pe. Note that, the control of the evaporation pressure Pe by the compressor 21 in the present embodiment is achieved in the following manner: the refrigerant temperature (which corresponds to the evaporation temperature Te) detected by the liquid side temperature sensors T9a to T9c of the indoor heat exchangers 31a to 31c is converted to saturation pressure; the operation capacity of the compressor 21 is controlled such that the saturation pressure becomes constant at a target low pressure Pes (in other words, the control to change the rotation frequency Rm of the motor 21a is performed); and then a refrigerant circulation flow rate Wc flowing in the refrigerant circuit 10 is increased or decreased. Note that, although it is not employed in the present embodiment, the operation capacity of the compressor 21 may be controlled such that the suction pressure Ps of the compressor 21 detected by the suction pressure sensor P1, which is the operation state quantity equivalent to the pressure of the refrigerant at the evaporation pressure Pe of the refrigerant in the indoor heat exchangers 31a to 31c, becomes constant at the target low pressure Pes, or the saturation temperature (which corresponds to the evaporation temperature Te) corresponding to the suction pressure Ps becomes constant at a target low pressure Pes. Also, the operation capacity of the compressor 21 may be controlled such that the refrigerant temperature (which corresponds to the evaporation temperature Te) detected by the liquid side temperature sensors T9a to T9c of the indoor heat exchangers 31a to 31c becomes constant at the target low pressure Pes.

Then, by performing such evaporation pressure control, the state of the refrigerant flowing through the refrigerant pipes from the indoor heat exchangers 31a to 31c to the compressor 21 including the low pressure gas refrigerant communication pipe 53 and the accumulator 23 (see the portion from the indoor heat exchangers 31a to 31c to the compressor 21 in the area indicated by diagonal hatching in FIG. 5, which is hereinafter referred to as "gas refrigerant distribution portion D") becomes stabilized, creating a state where the refrigerant quantity in the gas refrigerant distribution portion D changes mainly by the evaporation pressure Pe (i.e., the suction pressure Ps), which is the operation state quantity equivalent to the pressure of the refrigerant in the gas refrigerant distribution portion D.

In addition, the reason to perform the condensation pressure control is because the condensation pressure Pc of the refrigerant is greatly affected by the refrigerant quantity in the outdoor heat exchanger 22 where the high pressure refrigerant flows while undergoing a phase change from a gas state to a liquid state as a result of heat exchange with the outdoor air (see the portion corresponding to the outdoor heat exchanger 22 in the area indicated by diagonal hatching and black hatching in FIG. 5, which is hereinafter referred to as "condenser portion A"). The condensation pressure Pc of the refrigerant in the condenser portion A greatly changes due to the effect of the outdoor temperature Ta. Therefore, the air flow rate Wo of outdoor air supplied from the outdoor fan 25 to the outdoor heat exchanger 22 is controlled by the motor 25a, and thereby the condensation pressure Pc of the refrigerant in the outdoor heat exchanger 22 is maintained constant and the state of the refrigerant flowing in the condenser portion A is stabilized. In other words, a state is created where the refrigerant quantity in the condenser portion A changes mainly by a subcooling degree SCo at the liquid side of the outdoor heat exchanger 22 (hereinafter referred to as the outlet of the outdoor heat exchanger 22 in the description regarding the refrigerant quantity judging operation). Note that, for the control of the condensation pressure Pc by the outdoor fan 25 in the present embodiment, the discharge pressure Pd of the compressor 21 detected by the discharge pressure sensor P2, which is the operation state quantity equivalent to the condensation pressure Pc of the refrigerant in the outdoor heat exchanger 22, or the temperature of the refrigerant flowing through the outdoor heat exchanger 22 (i.e., the condensation temperature Tc) detected by the heat exchanger temperature sensor T3 is used.

Then, by performing such condensation pressure control, the high pressure liquid refrigerant flows along the flow path from the outdoor heat exchanger 22 to the indoor expansion valves V9a to V9c (including the outdoor expansion valve V2, the portion on the main refrigerant circuit side of the subcooler 24, and the first liquid refrigerant communication pipe 51) and the flow path from the outdoor heat exchanger 22 to the bypass expansion valve V7 of the second bypass refrigerant circuit 6, the pressure of the refrigerant in the portions from the outdoor heat exchanger 22 to the indoor expansion valves V9a to V9c and to the bypass expansion valve V7 (see the area indicated by black hatching in FIG. 5, which is hereinafter referred to as "liquid refrigerant distribution portion B") becomes stabilized, and the liquid refrigerant distribution portion B is sealed by the liquid refrigerant, thereby becoming a stable state.

In addition, the reason to perform the liquid pipe temperature control is to prevent a change in the density of the refrigerant in the refrigerant pipes from the subcooler 24 to the indoor expansion valves V9a to V9c including the first liquid refrigerant communication pipe 51 (see the portion from the subcooler 24 to the indoor expansion valves V9a to V9c in the liquid refrigerant distribution portion B shown in FIG. 5). Performance of the subcooler 24 is controlled by increasing or decreasing the flow rate of the refrigerant flowing in the second bypass refrigerant circuit 6 such that the refrigerant temperature Tlp detected by the liquid pipe temperature sensor T5 disposed at the outlet on the main refrigerant circuit side of the subcooler 24 becomes constant at a target liquid pipe temperature Tlps, and by adjusting the quantity of heat exchange between the refrigerant flowing in the main refrigerant circuit side and the refrigerant flowing in the second bypass refrigerant circuit 6 side of the subcooler 24. Note that, the flow rate of the refrigerant in the second bypass refrigerant circuit 6 is increased or decreased by adjustment of the opening degree of the bypass expansion valve V7. In this way, the liquid pipe temperature control is achieved in which the refrigerant temperature in the refrigerant pipes from the subcooler 24 to the indoor expansion valves V9a to V9c including the first liquid refrigerant communication pipe 51 becomes constant.

Then, even when the refrigerant temperature Tco at the outlet of the outdoor heat exchanger 22 (i.e., the subcooling degree SCo of the refrigerant at the outlet of the outdoor heat exchanger 22) changes along with an increase in the refrigerant quantity by charging refrigerant into the refrigerant circuit 10, the effect of a change in the refrigerant temperature Tco at the outlet of the outdoor heat exchanger 22 will remain only within the refrigerant pipes from the outlet of the outdoor heat exchanger 22 to the subcooler 24 as a result of performing such liquid pipe temperature constant control. Accordingly, the effect of a change in the refrigerant temperature Tco at the outlet of the outdoor heat exchanger 22 will not extend to the refrigerant pipes from the subcooler 24 to the indoor expansion valves V9a to V9c including the first liquid refrigerant communication pipe 51 in the liquid refrigerant distribution portion B.

Further, the reason to perform the superheating degree control is because the refrigerant quantity in the evaporator portion C greatly affects the quality of wet vapor of the refrigerant at the outlets of the indoor heat exchangers 31a to 31c. The superheating degree SHr of the refrigerant at the outlet of each of the indoor heat exchangers 31a to 31c is controlled such that the superheating degree SHr of the refrigerant at the gas sides of the indoor heat exchangers 31a to 31c (hereinafter referred to as the outlets of the indoor heat exchangers 31a to 31c in the description regarding the refrigerant quantity judging operation) becomes constant at the target superheating degree SHrs (in other words, such that the gas refrigerant at the outlet of each of the indoor heat exchangers 31a to 31c is in a superheat state) by controlling the opening degree of the indoor expansion valves V9a to V9c, and thereby the state of the refrigerant flowing in the evaporator portion C is stabilized.

Consequently, by performing such superheating degree control, a state is created in which the gas refrigerant reliably flows in the gas refrigerant distribution portion D.

By various control described above, the state of the refrigerant circulating in the refrigerant circuit 10 becomes stabilized, and the distribution of the refrigerant quantity in the refrigerant circuit 10 becomes constant. Therefore, when refrigerant starts to be charged into the refrigerant circuit 10 by additional refrigerant charging, which is subsequently performed, it is possible to create a state where a change in the refrigerant quantity in the refrigerant circuit 10 mainly appears as a change of the refrigerant quantity in the outdoor heat exchanger 22 (hereinafter this operation is referred to as "refrigerant quantity judging operation").

Such control as described above is performed as the process in Step S11 by the controller 8 (more specifically, by the indoor side controllers 34a to 34c, the connection side controllers 44a and 44b, the outdoor side controller 26, and the transmission line 81 that interconnects each of the controllers 34a to 34c, 44a, 44b, and 26) that functions as a refrigerant quantity judging operation controlling means for performing the refrigerant quantity judging operation.

Note that, unlike the present embodiment, when refrigerant is not charged in advance in the outdoor unit 2, it is necessary prior to Step S11 to charge refrigerant until the refrigerant quantity reaches a level where constituent equipment will not abnormally stop during the above described refrigerant quantity judging operation.

(Step S12: Refrigerant Quantity Calculation)

Next, additional refrigerant is charged into the refrigerant circuit 10 while performing the above described refrigerant quantity judging operation. At this time, the controller 8 that functions as a refrigerant quantity calculating means calculates the refrigerant quantity in the refrigerant circuit 10 from the operation state quantity of constituent equipment or refrigerant flowing in the refrigerant circuit 10 during additional refrigerant charging in Step S12.

First, the refrigerant quantity calculating means in the present embodiment is described. The refrigerant quantity calculating means divides the refrigerant circuit 10 into a plurality of portions, calculates the refrigerant quantity for each divided portion, and thereby calculates the refrigerant quantity in the refrigerant circuit 10. More specifically, a relational expression between the refrigerant quantity in each portion and the operation state quantity of constituent equipment or refrigerant flowing in the refrigerant circuit 10 is set for each divided portion, and the refrigerant quantity in each portion can be calculated by using these relational expressions. In the present embodiment, when the four-way switching valve V1 is in a state indicated by solid lines in FIG. 1, i.e., a state where the discharge side of the compressor 21 is connected to the gas side of the outdoor heat exchanger 22 and where the suction side of the compressor 21 is connected to the outlets of the indoor heat exchangers 31a to 31c via the low pressure gas side stop valve V6 and the low pressure gas refrigerant communication pipe 53, the refrigerant circuit 10 is divided into the following portions and a relational expression is set for each portion: a portion corresponding to the compressor 21 and a portion from the compressor 21 to the outdoor heat exchanger 22 including the four-way switching valve V1 (not shown in FIG. 5) (hereinafter referred to as "high pressure gas pipe portion E"); a portion corresponding to the outdoor heat exchanger 22 (i.e., the condenser portion A); a portion from the outdoor heat exchanger 22 to the subcooler 24 and an inlet side half of a portion corresponding to the main refrigerant circuit side of the subcooler 24 in the liquid refrigerant distribution portion B (hereinafter referred to as "high temperature side liquid pipe portion B1"); an outlet side half of a portion corresponding to the main refrigerant circuit side of the subcooler 24 and a portion from the subcooler 24 to the liquid side stop valve V4 (not shown in FIG. 5) in the liquid refrigerant distribution portion B (hereinafter referred to as "low temperature side liquid pipe portion B2"); a portion combining the first liquid refrigerant communication pipe 51, the liquid side refrigerant flow path of the connection units 4a and 4b, and the second liquid refrigerant communication pipe 71a and 71b in the liquid refrigerant distribution portion B (hereinafter referred to as "liquid refrigerant communication pipe portion B3"); a portion from the first liquid refrigerant communication pipe 51 in the liquid refrigerant distribution portion B up to the second gas refrigerant communication pipes 72a and 72b in the gas refrigerant distribution portion D including portions corresponding to the indoor expansion valves V9a to V9c and the indoor heat exchangers 31a to 31c (i.e., the evaporator portion C) (hereinafter referred to as "indoor unit portion F"); a portion combining the high pressure gas refrigerant communication pipe 52 and the high pressure gas side refrigerant flow path (including up to the second bypass on/off valves V13a and V13b on the high pressure gas side of the third bypass refrigerant circuits 43a and 43b) in the connection units 4a and 4b (hereinafter referred to as "high pressure gas refrigerant communication pipe portion G1") in the gas refrigerant distribution portion D; a portion combining the low pressure gas refrigerant communication pipe 53, the second gas refrigerant communication pipes 72a and 72b, and the low pressure gas side refrigerant flow path in the connection units 4a and 4b (including up to the second bypass on/off valves V13a and V13b on the low pressure gas side of the third bypass refrigerant circuits 43a and 43b) (hereinafter referred to as "low pressure gas refrigerant communication pipe portion G2") in the gas refrigerant distribution portion D; a portion from the high pressure gas side stop valve V5 (not shown in FIG. 5) to the first high pressure gas on/off valve V8 (hereinafter referred to as "first low pressure gas pipe portion H") in the gas refrigerant distribution portion D; a portion combining a portion from the low pressure gas side stop valve V6 (not shown in FIG. 5) to the first bypass refrigerant circuit 27 and the first bypass refrigerant circuit 27 and a portion from the first bypass refrigerant circuit 27 to the four-way switching valve V1 and a portion from the first bypass refrigerant circuit 27 to the compressor 21 including the accumulator 23 (hereinafter referred to as "second low pressure gas pipe portion I"); and a portion from the high temperature side liquid pipe portion B1 to the second low pressure gas pipe portion I including the bypass expansion valve V7 and a portion corresponding to the second bypass refrigerant circuit 6 side of the subcooler 24 in the liquid refrigerant distribution portion B (hereinafter referred to as "second bypass circuit portion J"). Note that the portion combining the high pressure gas refrigerant communication pipe portion G1 and the low pressure gas refrigerant communication pipe portion G2 is referred to as a gas refrigerant communication pipe portion G. Next, the relational expressions set for each portion described above are described.

In the present embodiment, a relational expression between a refrigerant quantity Mog1 in the high pressure gas pipe portion E and the operation state quantity of constituent equipment or refrigerant flowing in the refrigerant circuit 10 is expressed, for example, by $$Mog1 = Vog1 \times \rho d,$$

which is a function expression in which a volume Vog1 of the high pressure gas pipe portion E in the outdoor unit 2 is multiplied by a density $\rho d$ of the refrigerant in high pressure gas pipe portion E. Note that, the volume Vog1 of the high pressure gas pipe portion E is a value that is known prior to installation of the outdoor unit 2 at the installation location and is stored in advance in the memory of the controller 8. In addition, the density $\rho d$ of the refrigerant in the high pressure gas pipe portion E is obtained by converting the discharge temperature Td and the discharge pressure Pd.

A relational expression between a refrigerant quantity Mc in the condenser portion A and the operation state quantity of constituent equipment or refrigerant flowing in the refrigerant circuit 10 is expressed, for example, by $$Mc = kc1 \times Ta + kc2 \times Tc + kc3 \times SHm + kc4 \times Wc + kc5 \times \rho c + kc6 \times \rho co + kc7,$$

which is a function expression of the outdoor temperature Ta, the condensation temperature Tc, a compressor discharge superheating degree SHm, the refrigerant circulation flow rate Wc, the saturated liquid density $\rho c$ of the refrigerant in the outdoor heat exchanger 22, and a density $\rho co$ of the refrigerant at the outlet of the outdoor heat exchanger 22. Note that, the parameters kc1 to kc7 in the above described relational expression are derived from a regression analysis of results of tests and detailed simulations and are stored in advance in the memory of the controller 8. In addition, the compressor discharge superheating degree SHm is a superheating degree of the refrigerant at the discharge side of the compressor, and is obtained by converting the discharge pressure Pd to refrigerant saturation temperature and subtracting this refrigerant saturation temperature from the discharge temperature Td. The refrigerant circulation flow rate Wc is expressed as a function of the evaporation temperature Te and the condensation temperature Tc (i.e., Wc=f(Te, Tc)). A saturated liquid density $\rho c$ of the refrigerant is obtained by converting the condensation temperature Tc. The density $\rho co$ of the refrigerant at the outlet of the outdoor heat exchanger 22 is obtained by converting the condensation pressure Pc, which is obtained by converting the condensation temperature Tc, and the refrigerant temperature Tco.

A relational expression between a refrigerant quantity Mol1 in the high temperature side liquid pipe portion B1 and the operation state quantity of constituent equipment or refrigerant flowing in the refrigerant circuit 10 is expressed, for example, by $$Mol1 = Vol1 \times \rho co,$$

which is a function expression in which a volume Vol1 of the high temperature side liquid pipe portion B1 in the outdoor unit 2 is multiplied by the density $\rho co$ of the refrigerant in the high temperature side liquid pipe portion B1 (i.e., the above described density of the refrigerant at the outlet of the outdoor heat exchanger 22). Note that, the volume Vol1 of the high pressure side liquid pipe portion B1 is a value that is known prior to installation of the outdoor unit 2 at the installation location and is stored in advance in the memory of the controller 8.

A relational expression between a refrigerant quantity Mol2 in the low temperature side liquid pipe portion B2 and the operation state quantity of constituent equipment or refrigerant flowing in the refrigerant circuit 10 is expressed, for example, by $$Mol2 = Vol2 \times \rho lp,$$

which is a function expression in which a volume Vol2 of the low temperature side liquid pipe portion B2 in the outdoor unit 2 is multiplied by a density pip of the refrigerant in the low temperature side liquid pipe portion B2. Note that, the volume Vol2 of the low temperature side liquid pipe portion B2 is a value that is known prior to installation of the outdoor unit 2 at the installation location and is stored in advance in the memory of the controller 8. In addition, the density $\rho lp$ of the refrigerant in the low temperature side liquid pipe portion B2 is the density of the refrigerant at the outlet of the subcooler 24, and is obtained by converting the condensation pressure Pc and the refrigerant temperature Tlp at the outlet of the subcooler 24.

A relational expression between a refrigerant quantity Mlp in the liquid refrigerant communication pipe portion B3 and the operation state quantity of constituent equipment or refrigerant flowing in the refrigerant circuit 10 is expressed, for example, by $$Mlp = Vlp \times \rho lp,$$

which is a function expression in which a volume Vlp of the portion combining the first liquid refrigerant communication pipe 51, the liquid side refrigerant flow path in the connection units 4a and 4b, and the second liquid refrigerant communication pipes 71a and 71b is multiplied by the density pip of the refrigerant in the liquid refrigerant communication pipe portion B3 (i.e., the density of the refrigerant at the outlet of the subcooler 24). Here, the volume Vlp is divided into a volume Vlp1 of the portion combining the first liquid refrigerant communication pipe 51 and the second liquid refrigerant communication pipes 71a and 71b and a volume Vlp2 of the liquid side refrigerant flow path in the connection units 4a and 4b. As for the volume Vlp1 of the portion combining the first liquid refrigerant communication pipe 51 and the second liquid refrigerant communication pipes 71a and 71b, because the first liquid refrigerant communication pipe 51 and the second liquid refrigerant communication pipes 71a and 71b are refrigerant pipes arranged on site when installing the air conditioner 1 at an installation location such as a building and the like, a value calculated on site from the information regarding the length, pipe diameter and the like is input, or information regarding the length, pipe diameter and the like is input on site, and the controller 8 calculates the volume Vlp1 from the input information of the first liquid refrigerant communication pipe 51 and the second liquid refrigerant communication pipes 71a and 71b. Or, as described below, the volume Vlp1 is calculated by using the operation results of the pipe volume judging operation. In addition, the volume Vlp2 of the liquid side refrigerant flow path in the connection units 4a and 4b is a value that is known prior to installation of the connection units 4a and 4b at the installation location and is stored in advance in the memory of the controller 8.

A relational expression between a refrigerant quantity Mr in the indoor unit portion F and the operation state quantity of constituent equipment or refrigerant flowing in the refrigerant circuit 10 is expressed, for example, by $$Mr = kr1 \times Tlp + kr2 \times \Delta T + kr3 \times SHr + kr4 \times Wr + kr5,$$

which is a function expression of the refrigerant temperature Tlp at the outlet of the subcooler 24, a temperature difference $\Delta T$ in which the evaporation temperature Te is subtracted from the room temperature Tr, the superheating degree SHr of the refrigerant at the outlets of the indoor heat exchangers 31a to 31c, and the air flow rate Wr of the indoor fans 32a to 32c. Note that, the parameters kr1 to kr5 in the above described relational expression are derived from a regression analysis of results of tests and detailed simulations and are stored in advance in the memory of the controller 8. Note that, here, the relational expression for the refrigerant quantity Mr is set for each of the three indoor units 3a to 3c, and the entire refrigerant quantity in the indoor unit portion F is calculated by adding the refrigerant quantity Mr in the indoor unit 3a, the refrigerant quantity Mr in the indoor unit 3b, and the refrigerant quantity Mr in the indoor unit 3c. Note that, relational expressions having parameters kr1 to kr5 with different values will be used when the model and/or capacity is different among the indoor unit 3a, the indoor unit 3b, and the indoor unit 3c.

The gas refrigerant communication pipe portion G is divided into a high pressure gas refrigerant communication pipe portion G1 and a low pressure gas refrigerant communication pipe portion G2, and a refrigerant quantity Mgp in the gas refrigerant communication pipe portion G is a value obtained by adding a refrigerant quantity Mgph in the high pressure gas refrigerant communication pipe portion G1 and a refrigerant quantity Mgpl in the low pressure gas refrigerant communication pipe portion G2. In addition, a volume Vgp of the gas refrigerant communication pipe portion G is a value obtained by adding a volume Vgph of the high pressure gas refrigerant communication pipe portion G1 and a volume Vgpl of the low pressure gas refrigerant communication pipe portion G2. In other words, theses relational expressions are expressed as follows.

$$Mgp = Mgph + Mgpl$$

$$Vgp = Vgph + Vgpl$$

A relational expression between the refrigerant quantity Mgph in the high pressure gas refrigerant communication pipe portion G1 and the operation state quantity of constituent equipment or refrigerant flowing in the refrigerant circuit 10 is expressed, for example, by $$Mgph = Vgph \times \rho gph,$$

which is a function expression in which the volume Vgph of the portion combining the high pressure gas refrigerant communication pipe 52 and the high pressure gas side refrigerant flow path in the connection units 4a and 4b (including up to the second bypass on/off valves V13a and V13b on the high pressure gas side of the third bypass refrigerant circuits 43a and 43b) is multiplied by a density $\rho gph$ of the refrigerant in the high pressure gas refrigerant communication pipe portion G1. Here, the volume Vgph is divided into a volume Vgph1 of the high pressure gas refrigerant communication pipe 52 and a volume Vgph2 of the high pressure gas side refrigerant flow path in the connection units 4a and 4b (including up to the second bypass on/off valves V13a and V13b on the high pressure gas side in the third bypass refrigerant circuits 43a and 43b). As for the volume Vgp1 of the high pressure gas refrigerant communication pipe 52, as is the case with the portion combining the first liquid refrigerant communication pipe 51 and the second liquid refrigerant communication pipes 71a and 71b, because the high pressure gas refrigerant communication pipe 52 is a refrigerant pipe arranged on site when installing the air conditioner 1 at an installation location such as a building and the like, a value calculated on site from the information regarding the length, pipe diameter and the like is input, or information regarding the length, pipe diameter and the like is input on site, and the controller 8 calculates the volume Vgp1 from the input information of the high pressure gas refrigerant communication pipe 52. Or, as described below, the volume Vgp1 is calculated by using the operation results of the pipe volume judging operation. In addition, the density $\rho gph$ of the refrigerant in the high pressure gas refrigerant communication pipe portion G1 is an average value among: a density $\rho s$ of the refrigerant at the suction side of the compressor 21, a density $\rho oh$ of the refrigerant in the pipe on the high pressure gas side between the high pressure gas side stop valve V5 and the first high pressure gas on/off valve V8 in the outdoor unit 2, a density $\rho bsh$ of the refrigerant in the high pressure gas side refrigerant flow path in the connection units 4a and 4b and a density $\rho eo$ of the refrigerant at the outlets of the indoor heat exchangers 31a to 31c (i.e., the inlets of the second gas refrigerant communication pipes 72a and 72b). The density $\rho s$ of the refrigerant is obtained by converting the suction pressure Ps and the suction temperature Ts. The density $\rho oh$ of the refrigerant is obtained by converting the first high pressure gas pipe temperature Th1. The density $\rho bsh$ of the refrigerant is obtained by converting the second high pressure gas pipe temperature Th2. The density $\rho eo$ of the refrigerant is obtained by converting the evaporation pressure Pe, which is a converted value of the evaporation temperature Te, and the outlet temperature Teo of each of the indoor heat exchangers 31a to 31c. In addition, the volume Vgph2 of the high pressure gas side refrigerant flow path in the connection units 4a and 4b (including up to the second bypass on/off valves V13a and V13b on the high pressure gas side in the third bypass refrigerant circuits 43a and 43b) is a value that is known prior to installation of the connection units 4a and 4b at the installation location and is stored in advance in the memory of the controller 8.

A relational expression between the refrigerant quantity Mgpl in the low pressure gas refrigerant communication pipe portion G2 and the operation state quantity of constituent equipment or refrigerant flowing in the refrigerant circuit 10 is expressed, for example, by $$Mgpl = Vgpl \times \rho gpl,$$

which is a function expression in which the volume Vgpl of a portion combining the low pressure gas refrigerant communication pipe 53, the second gas refrigerant communication pipes 72a and 72b, and the low pressure gas refrigerant flow path in the connection units 4a and 4b (including up to the second bypass on/off valves V13a and V13b on the low pressure gas side of the third bypass refrigerant circuits 43a and 43b) is multiplied by a density ρgpl of the refrigerant in the low pressure gas refrigerant communication pipe portion G2. Here, the volume Vgpl is divided into a volume Vgpl1 of a portion combining the low pressure gas refrigerant communication pipe 53 and the second gas refrigerant communication pipes 72a and 72b, and a volume Vgpl2 of the low pressure gas side refrigerant flow path in the connection units 4a and 4b (including up to the second bypass on/off valves V13a and V13b on the low pressure gas side in the third bypass refrigerant circuits 43a and 43b). As for the volume Vgpl1 of the portion combining the low pressure gas refrigerant communication pipe 53 and the second gas refrigerant communication pipes 72a and 72b, as is the case with the portion combining the first liquid refrigerant communication pipe 51 and the second liquid refrigerant communication pipes 71a and 71b and also as is the case with the high pressure gas refrigerant communication pipe 52, because the low pressure gas refrigerant communication pipe 53 and the second gas refrigerant communication pipes 72a and 72b are refrigerant pipes arranged on site when installing the air conditioner 1 at an installation location such as a building and the like, a value calculated on site from the information regarding the length, pipe diameter and the like is input, or information regarding the length, pipe diameter and the like is input on site, and the controller 8 calculates the volume Vgpl1 from the input information of the low pressure gas refrigerant communication pipe 53 and the second gas refrigerant communication pipes 72a and 72b. Or, as described below, the volume Vgpl1 is calculated by using the operation results of the pipe volume judging operation. In addition, the density ρgpl of the refrigerant in the low pressure gas refrigerant communication pipe portion G2 is an average value between the density ρs of the refrigerant at the suction side of the compressor 21 and the density ρeo of the refrigerant at the outlets of the indoor heat exchangers 31a to 31c (i.e., the inlets of the second gas refrigerant communication pipes 72a and 72b). The density ρs of the refrigerant is obtained by converting the suction pressure Ps and the suction temperature Ts, and the density ρeo of the refrigerant is obtained by converting the evaporation pressure Pe, which is a converted value of the evaporation temperature Te, and the outlet temperature Teo of each of the indoor heat exchangers 31a to 31c. In addition, the volume Vgpl2 of the low pressure gas side refrigerant flow path in the connection units 4a and 4b (including up to the second bypass on/off valves V13a and V13b on the low pressure gas side in the third bypass refrigerant circuits 43a and 43b) is a value that is known prior to installation of the connection units 4a and 4b at the installation location and is stored in advance in the memory of the controller 8.

A relational expression between a refrigerant quantity Mog2 in the first low pressure gas pipe portion H and the operation state quantity of constituent equipment or refrigerant flowing in the refrigerant circuit 10 is expressed, for example, by $$Mog2 = Vog2 \times \rho oh,$$

which is a function expression in which a volume Vog2 of the first low pressure gas pipe portion H in the outdoor unit 2 is multiplied by the density ρoh of the refrigerant in the first low pressure gas pipe portion H. Note that, the volume Vog2 of the first low pressure gas pipe portion H is a value that is known prior to shipment to the installation location and is stored in advance in the memory of the controller 8.

A relational expression between a refrigerant quantity Mog3 in the second low pressure gas pipe portion I and the operation state quantity of constituent equipment or refrigerant flowing in the refrigerant circuit 10 is expressed, for example, by $$Mog3 = Vog3 \times \rho s,$$

which is a function expression in which a volume Vog3 of the second low pressure gas pipe portion I in the outdoor unit 2 is multiplied by the density Ps of the refrigerant in the second low pressure gas pipe portion I. Note that, the volume Vog3 of the second low pressure gas pipe portion I is a value that is known prior to shipment to the installation location and is stored in advance in the memory of the controller 8.

A relational expression between a refrigerant quantity Mob in the second bypass circuit portion J and the operation state quantity of constituent equipment or refrigerant flowing in the refrigerant circuit 10 is expressed, for example, by $$Mob = kob1 \times \rho co + kob2 \times \rho s + kob3 \times Pe + kob4,$$

which is a function expression of the density ρco of the refrigerant at the outlet of the outdoor heat exchanger 22, and the density ρs of the refrigerant at the outlet on the bypass circuit side of the subcooler 24 and the evaporation pressure Pe. Note that, the parameters kob1 to kob3 in the above described relational expression are derived from a regression analysis of results of tests and detailed simulations and are stored in advance in the memory of the controller 8. In addition, the refrigerant quantity Mob of the second bypass circuit portion J may be calculated using a simpler relational expression because the refrigerant quantity in that portion is smaller compared to other portions. For example, it is expressed as follows:

$$Mob = Vob \times \rho e \times kob5,$$

which is a function expression in which a volume Vob of the second bypass circuit portion J is multiplied by the saturated liquid density ρe at the portion corresponding to the second bypass circuit side of the subcooler 24 and a correct coefficient kob. Note that, the volume Vob of the second bypass circuit portion J is a value that is known prior to installation of the outdoor unit 2 at the installation location and is stored in advance in the memory of the controller 8. In addition, the saturated liquid density ρe at the portion on the second bypass circuit side of the subcooler 24 is obtained by converting the suction pressure Ps or the evaporation temperature Te.

Note that, in the present embodiment, one outdoor unit 2 is provided. However, when a plurality of outdoor units are connected, as for the refrigerant quantities in the outdoor unit such as Mog1, Mc, Mol1, Mol2, Mog2, Mog3, and Mob, the relational expression for the refrigerant quantity in each portion is set for each of the plurality of outdoor units, and the entire refrigerant quantity in the outdoor units is calculated by adding the refrigerant quantity in each portion of the plurality of the outdoor units. Note that, relational expressions for the refrigerant quantity in each portion having parameters with different values will be used when a plurality of outdoor units with different models and capacities are connected.

As described above, in the present embodiment, by using the relational expressions for each portion in the refrigerant circuit 10, the refrigerant quantity in each portion is calculated from the operation state quantity of constituent equipment or refrigerant flowing in the refrigerant circuit 10 in the refrigerant quantity judging operation, and thereby the refrigerant quantity in the refrigerant circuit 10 can be calculated.

Further, this Step S12 is repeated until the condition for judging the adequacy of the refrigerant quantity in the below described Step S13 is satisfied. Therefore, in the period from the start to the completion of additional refrigerant charging, the refrigerant quantity in each portion is calculated from the operation state quantity during refrigerant charging by using the relational expressions for each portion in the refrigerant circuit 10. More specifically, a refrigerant quantity Mo in the outdoor unit 2, the refrigerant quantity Mr in each of the indoor units 3a to 3c, and a refrigerant quantity Mbs in each of the connection units 4a and 4b (=Vlp2×ρlp+Vgp2×ρgp) (i.e., the refrigerant quantity in each portion in the refrigerant circuit 10 excluding the first refrigerant communication pipe group 5 and the second refrigerant communication pipe group 7) necessary for judgment of the adequacy of the refrigerant quantity in the below described Step S13 are calculated. Here, the refrigerant quantity Mo in the outdoor unit 2 is calculated by adding the refrigerant quantities Mog1, Mc, Mol1, Mol2, Mog2, Mog3, and Mob in the above described each portion in the outdoor unit 2.

In this way, the process in Step S12 is performed by the controller 8 that functions as the refrigerant quantity calculating means for calculating the refrigerant quantity in each portion in the refrigerant circuit 10 from the operation state quantity of constituent equipment or refrigerant flowing in the refrigerant circuit 10 in the automatic refrigerant charging operation.

(Step S13: Judging the Adequacy of the Refrigerant Quantity)

As described above, when additional refrigerant charging into the refrigerant circuit 10 starts, the refrigerant quantity in the refrigerant circuit 10 gradually increases. Here, when the volume of the first refrigerant communication pipe group 5 is unknown, the refrigerant quantity that should be charged into the refrigerant circuit 10 after additional refrigerant charging cannot be prescribed as the refrigerant quantity in the entire refrigerant circuit 10. However, when the focus is placed only on the outdoor unit 2, the indoor units 3a to 3c, and the connection units 4a and 4b (i.e., the refrigerant circuit 10 excluding the first refrigerant communication pipe group 5 and the second refrigerant communication pipe group 7), it is possible to know in advance the optimal refrigerant quantity in the outdoor unit 2 in the normal operation mode by tests and detailed simulations. Therefore, additional refrigerant can be charged by the following manner: a value of this refrigerant quantity is stored as a target charging value Ms, in advance, in the memory of the controller 8; the refrigerant quantity Mo in the outdoor unit 2, the refrigerant quantity Mr in each of the indoor units 3a to 3c, and the refrigerant quantity Mbs in each of the connection units 4a and 4b are calculated from the operation state quantity of constituent equipment or refrigerant flowing in the refrigerant circuit 10 in the automatic refrigerant charging operation by using the above described relational expressions; and additional refrigerant is charged until a value of the sum of the above calculated refrigerant quantities reaches the target charging value Ms. In other words, Step S13 is a process to judge the adequacy of the refrigerant quantity charged into the refrigerant circuit 10 by additional refrigerant charging by judging whether or not the refrigerant quantity, which is obtained by adding the refrigerant quantity Mo in the outdoor unit 2, the refrigerant quantity Mr in the indoor units 3a to 3c, and the refrigerant quantity Mbs in the connection units 4a and 4b in the automatic refrigerant charging operation, has reached the target charging value Ms.

Then, in Step S13, when a value of the refrigerant quantity obtained by adding the refrigerant quantity Mo in the outdoor unit 2, the refrigerant quantity Mr in each of the indoor units 3a to 3c, and the refrigerant quantity Mbs in each of the connection units 4a and 4b is smaller than the target charging value Ms and additional refrigerant charging has not been completed, the process in Step S13 is repeated until the target charging value Ms is reached. In addition, when a value of the refrigerant quantity obtained by adding the refrigerant quantity Mo in the outdoor unit 2, the refrigerant quantity Mr in each of the indoor units 3a to 3c, and the refrigerant quantity Mbs in each of the connection units 4a and 4b reaches the target charging value Ms, additional refrigerant charging is completed, and Step S1 as the automatic refrigerant charging operation process is completed.

Note that, in the above described refrigerant quantity judging operation, as the amount of additional refrigerant charged into the refrigerant circuit 10 increases, a tendency of an increase in the subcooling degree SCo at the outlet of the outdoor heat exchanger 22 appears, causing the refrigerant quantity Mc in the outdoor heat exchanger 22 to increase, and the refrigerant quantity in other portions tends to be maintained substantially constant. Therefore, the target charging value Ms may be set as a value corresponding to only the refrigerant quantity Mo in the outdoor unit 2 instead of corresponding to all of the outdoor unit 2, the indoor units 3a to 3c, and the connection units 4a and 4b; or may be set as a value corresponding to the refrigerant quantity Mc in the outdoor heat exchanger 22, and additional refrigerant may be charged until the target charging value Ms is reached under such setting.

In this way, the process in Step S13 is performed by the controller 8 that functions as the refrigerant quantity judging means for judging the adequacy of the refrigerant quantity in the refrigerant circuit 10 in the refrigerant quantity judging operation of the automatic refrigerant charging operation (i.e., for judging whether or not the refrigerant quantity has reached the target charging value Ms).

(Step S2: Pipe Volume Judging Operation)

Figure 6:
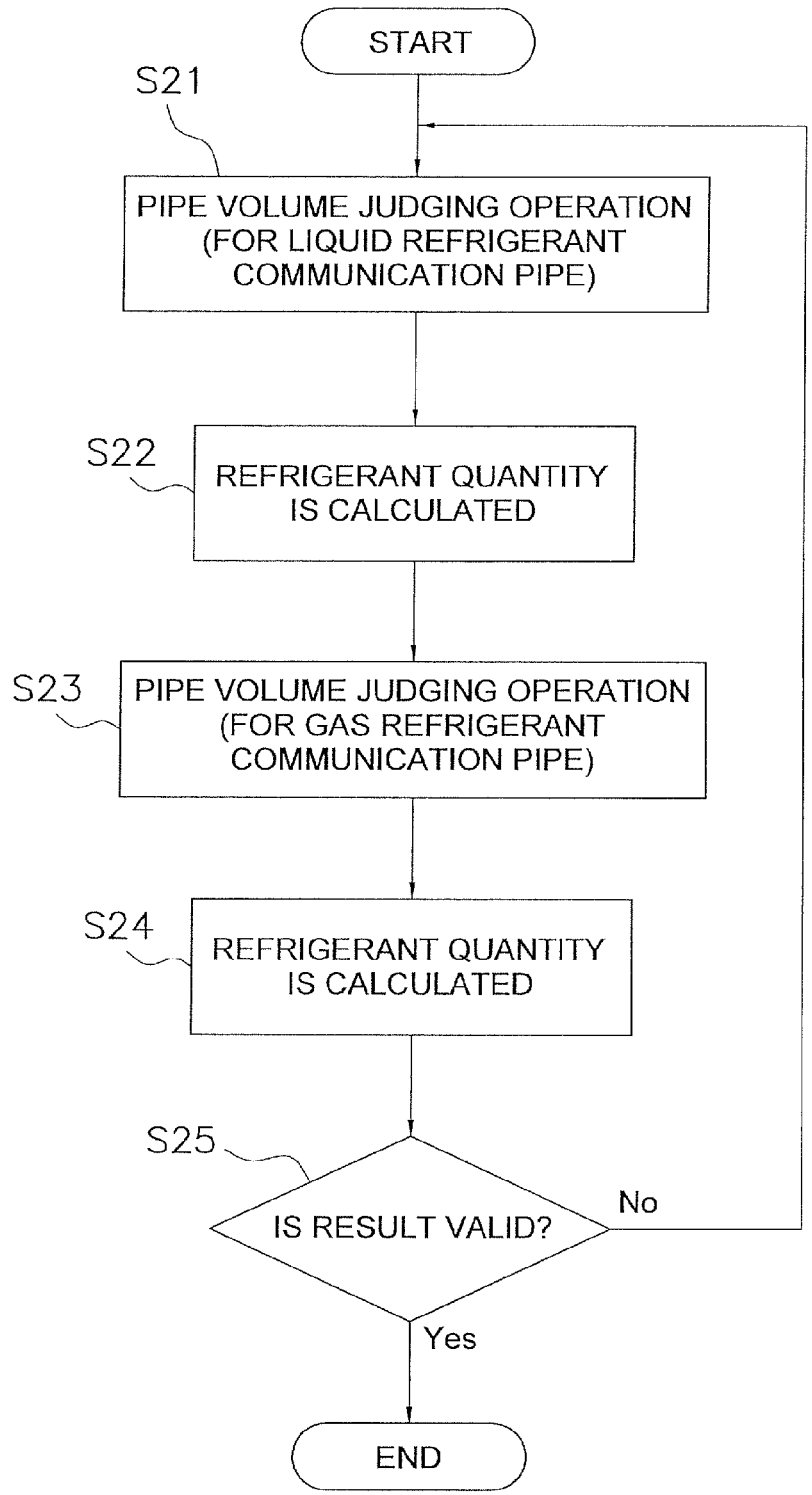
FIG. 6 is a flowchart of a pipe volume judging operation.

When the above described automatic refrigerant charging operation in Step S1 is completed, the process proceeds to the pipe volume judging operation in Step S2. In the pipe volume judging operation, the process from Step S21 to Step S25 as shown in FIG. 6 is performed by the controller 8. Here, FIG. 6 is a flowchart of the pipe volume judging operation.

(Steps S21, S22: Pipe Volume Judging Operation for the Liquid Refrigerant Communication Pipe and Volume Calculation)

Figure 7:
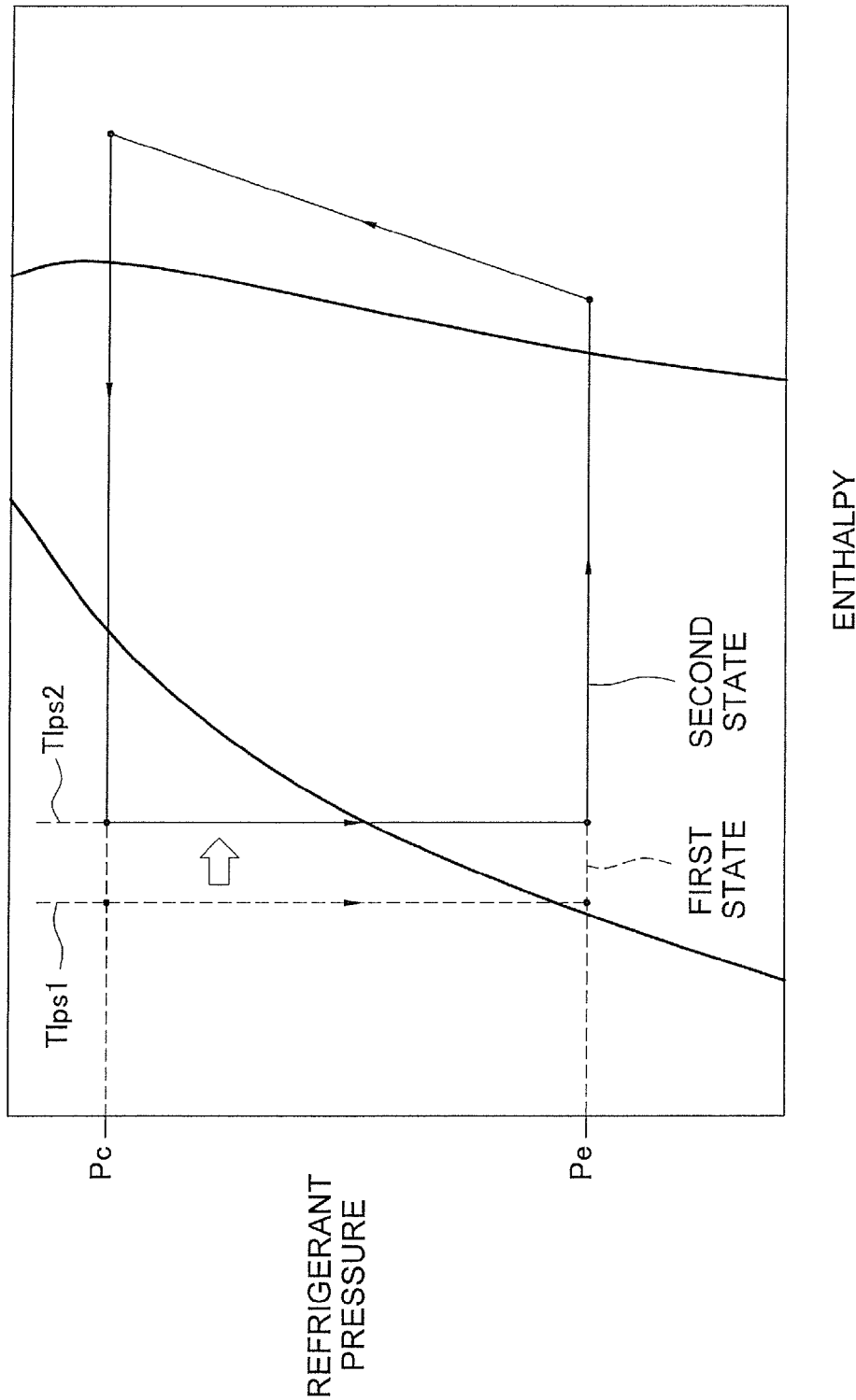
FIG. 7 is a Mollier diagram to show a refrigerating cycle of the air conditioner in the pipe volume judging operation for a liquid refrigerant communication pipe.

In Step S21, as is the case with the above described refrigerant quantity judging operation in Step S11 of the automatic refrigerant charging operation as described above, the pipe volume judging operation for the liquid refrigerant communication pipe portion B3, including the all indoor unit operation, condensation pressure control, liquid pipe temperature control, superheating degree control, and evaporation pressure control, is performed. Here, the target liquid pipe temperature Tlps of the temperature Tlp of the refrigerant at the outlet on the main refrigerant circuit side of the subcooler 24 in the liquid pipe temperature control is regarded as a first target value Tlps1, and the state where the refrigerant quantity judging operation is stable at this first target value Tlps1 is regarded as a first state (see the refrigerating cycle indicated by lines including dotted lines in FIG. 7). Note that, FIG. 7 is a Mollier diagram to show the refrigerating cycle of the air conditioner 1 in the pipe volume judging operation for the liquid refrigerant communication pipe.

Next, the first state where the temperature Tlp of the refrigerant at the outlet on the main refrigerant circuit side of the subcooler 24 in liquid pipe temperature control is stable at the first target value Tlps1 is switched to a second state (see the refrigerating cycle indicated by solid lines in FIG. 7) where the target liquid pipe temperature Tlps is changed to a second target value Tlps2 different from the first target value Tlps1 and stabilized without changing the conditions for other equipment controls, i.e., the conditions for the condensation pressure control, superheating degree control, and evaporation pressure control (i.e., without changing the target superheating degree SHrs and the target low pressure Pes). In the present embodiment, the second target value Tlps2 is a temperature higher than the first target value Tlps1.

In this way, by changing from the stable state at the first state to the second state, the density of the refrigerant in the liquid refrigerant communication pipe portion B3 decreases, and therefore the refrigerant quantity Mlp in the liquid refrigerant communication pipe portion B3 in the second state decreases compared to the refrigerant quantity in the first state. Then, the refrigerant whose quantity has decreased in the liquid refrigerant communication pipe portion B3 moves to other portions in the refrigerant circuit 10. More specifically, as described above, the conditions for other equipment controls other than the liquid pipe temperature control are not changed, and therefore the refrigerant quantity Mog1 in the high pressure gas pipe portion E, the refrigerant quantity Mog2 in the first low pressure gas pipe portion H, the refrigerant quantity Mog3 in the second low pressure gas pipe portion I, and the refrigerant quantity Mgph in the high pressure gas refrigerant communication pipe portion G1 and the refrigerant quantity Mgpl in the low pressure gas refrigerant communication pipe portion G2 are maintained substantially constant, and the refrigerant whose quantity has decreased in the liquid refrigerant communication pipe portion B3 will move to the condenser portion A, the high temperature side liquid pipe portion B1, the low temperature side liquid pipe portion B2, the indoor unit portion F, and the second bypass circuit portion J. In other words, the refrigerant quantity Mc in the condenser portion A, the refrigerant quantity Mol1 in the high temperature side liquid pipe portion B1, the refrigerant quantity Mol2 in the low temperature side liquid pipe portion B2, the refrigerant quantity Mr in the indoor unit portion F, and the refrigerant quantity Mob in the second bypass circuit portion J will increase by the quantity of the refrigerant that has decreased in the liquid refrigerant communication pipe portion B3.

Such control as described above is performed as the process in Step S21 by the controller 8 (more specifically, by the indoor side controllers 34a to 34c, the connection side controllers 44a and 44b, the outdoor side controller 26, and the transmission line 81 that interconnects each of the controllers 34a to 34c, 44a, 44b, and 26) that functions as a pipe volume judging operation controlling means for performing the pipe volume judging operation to calculate the refrigerant quantity Mlp of the liquid refrigerant communication pipe potion B3.

Next, in Step S22, the volume Vlp of the liquid refrigerant communication pipe portion B3 is calculated by utilizing a phenomenon that the refrigerant quantity in the liquid refrigerant communication pipe portion B3 decreases and the refrigerant whose quantity has decreased moves to other portions in the refrigerant circuit 10 because of the change from the first state to the second state.

First, a calculation formula used in order to calculate the volume Vlp of the liquid refrigerant communication pipe portion B3 is described. Provided that the quantity of the refrigerant that has decreased in the liquid refrigerant communication pipe portion B3 and moved to other portions in the refrigerant circuit 10 by the above described pipe volume judging operation is a refrigerant increase/decrease quantity $\Delta Mlp$, and that the increase/decrease quantities of the refrigerant in each portion between the first state and the second state are $\Delta Mc$, $\Delta Mol1$, $\Delta Mol2$, $\Delta Mr$, and $\Delta Mob$ (here, the refrigerant quantity Mog1, the refrigerant quantity Mog2, the refrigerant quantity Mog3, the refrigerant quantity Mgph, and the refrigerant quantity Mgpl are omitted because they are maintained substantially constant), the refrigerant increase/decrease quantity $\Delta Mlp$ can be, for example, calculated by the following function expression:

$$\Delta Mlp = -(\Delta Mc + \Delta Mol1 + \Delta Mol2 + \Delta Mr + \Delta Mob).$$

Then, the value of $\Delta Mlp$ is divided by a density change quantity $\Delta \rho lp$ of the refrigerant between the first state and the second state in the liquid refrigerant communication pipe portion B3, and thereby the volume Vlp of the liquid refrigerant communication pipe portion B3 can be calculated. Note that, although there is little effect on a calculation result of the refrigerant increase/decrease quantity $\Delta Mlp$, the refrigerant quantity Mog1 and the refrigerant quantity Mog2 may be included in the above described function expression.

$$Vlp = \Delta Mlp / \Delta \rho lp$$

In addition, the volume Vlp2 of the liquid side refrigerant flow path in the connection units 4a and 4b is a value that is known prior to installation of the connection units 4a and 4b at the installation location. Thus, it is possible to determine the volume Vlp1 of the portion combining the first liquid refrigerant communication pipe 51 and the second liquid refrigerant communication pipes 71a and 71b, which are the refrigerant pipes arranged on site when installing the air conditioner 1 at an installation location such as a building and the like, by subtracting the volume Vlp2 from the volume Vlp of the liquid refrigerant communication pipe portion B3, which is determined by the calculation.

Note that, $\Delta Mc$, $\Delta Mol1$, $\Delta Mol2$, $\Delta Mr$, and $\Delta Mob$ can be obtained by calculating the refrigerant quantity in the first state and the refrigerant quantity in the second state by using the above described relational expression for each portion in the refrigerant circuit 10 and further by subtracting the refrigerant quantity in the first state from the refrigerant quantity in the second state. In addition, the density change quantity $\Delta \rho lp$ can be obtained by calculating the density of the refrigerant at the outlet of the subcooler 24 in the first state and the density of the refrigerant at the outlet of the subcooler 24 in the second state and further by subtracting the density of the refrigerant in the first state from the density of the refrigerant in the second state.

By using the calculation formula as described above, the volume Vlp of the liquid refrigerant communication pipe portion B3 can be calculated from the operation state quantity of constituent equipment or refrigerant flowing in the refrigerant circuit 10 in the first and second states.

Note that, in the present embodiment, the state is changed such that the second target value Tlps2 in the second state becomes a temperature higher than the first target value Tlps1 in the first state and therefore the refrigerant in the low temperature side liquid pipe portion B2 is moved to other portions to increase the refrigerant quantity in other portions; thereby the volume Vlp of the liquid refrigerant communication pipe portion B3 is calculated from the increased quantity. However, the state may be changed such that the second target value Tlps2 in the second state becomes a temperature lower than the first target value Tlps1 in the first state and therefore the refrigerant is moved from other portions to the liquid refrigerant communication pipe portion B3 to decrease the refrigerant quantity in other portions; thereby the volume Vlp of the liquid refrigerant communication pipe portion B3 is calculated from the decreased quantity.

In this way, the process in Step S22 is performed by the controller 8 that functions as the pipe volume calculating means for the liquid refrigerant communication pipe, which calculates the volume Vlp of the liquid refrigerant communication pipe portion B3 from the operation state quantity of constituent equipment or refrigerant flowing in the refrigerant circuit 10 in the pipe volume judging operation for the liquid refrigerant communication pipe portion B3.

(Steps S23, S24: Pipe Volume Judging Operation and Volume Calculation for the Gas Refrigerant Communication Pipe)

After the above described Step S21 and Step S22 are completed, the pipe volume judging operation for the gas refrigerant communication pipe portion G, including the all indoor unit operation, condensation pressure control, liquid pipe temperature control, superheating degree control, and evaporation pressure control, is performed in Step S23. Here, the target low pressure Pes of the suction pressure Ps of the compressor 21 in the evaporation pressure control is regarded as a first target value Pes1, and the state where the refrigerant quantity judging operation is stable at this first target value Pes1 is regarded as a first state (see the refrigerating cycle indicated by lines including dotted lines in FIG. 8). Note that FIG. 8 is a Mollier diagram to show the refrigerating cycle of the air conditioner 1 in the pipe volume judging operation for the gas refrigerant communication pipe.

Figure 8:
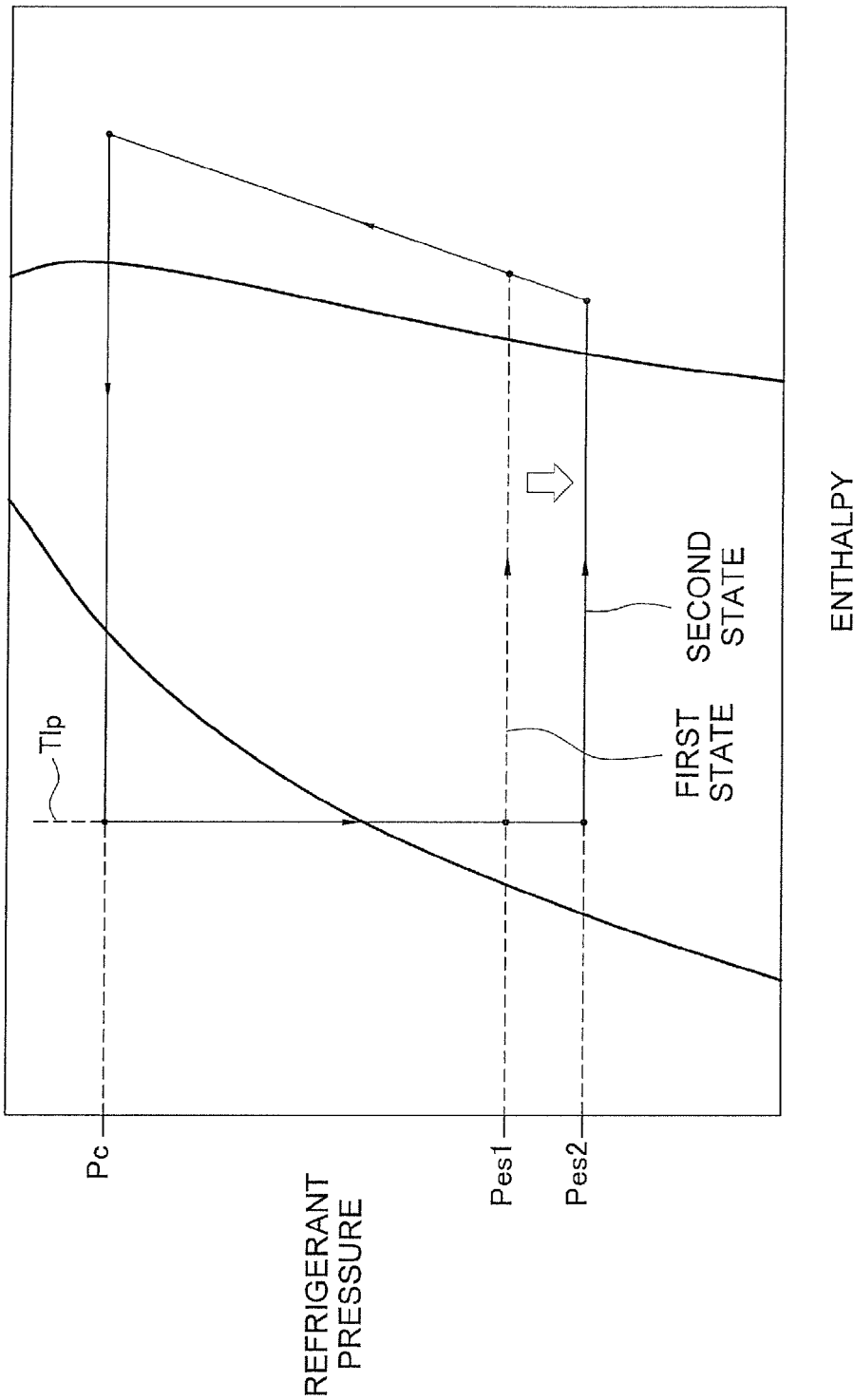
FIG. 8 is a Mollier diagram to show a refrigerating cycle of the air conditioner in the pipe volume judging operation for a gas refrigerant communication pipe.

Next, the first state where the target low pressure Pes of the suction pressure Ps in the compressor 21 in evaporation pressure control is stable at the first target value Pes1 is switched to a second state (see the refrigerating cycle indicated only by solid lines in FIG. 8) where the target low pressure Pes is changed to a second target value Pes2 different from the first target value Pes1 and stabilized without changing the conditions for other equipment controls, i.e., without changing the conditions for the liquid pipe temperature control, the condensation pressure control, and the superheating degree control (i.e., without changing the target liquid pipe temperature Tlps and the target superheating degree SHrs). In the present embodiment, the second target value Pes2 is a pressure lower than the first target value Pes1.

In this way, by changing from the stable state at the first state to the second state, the density of the refrigerant in the gas refrigerant communication pipe portion G decreases, and therefore the refrigerant quantity Mgp in the gas refrigerant communication pipe portion G in the second state decreases compared to the refrigerant quantity in the first state. Then, the refrigerant whose quantity has decreased in the gas refrigerant communication pipe portion G will move to other portions in the refrigerant circuit 10. More specifically, as described above, the conditions for other equipment controls other than the evaporation pressure control are not changed, and therefore the refrigerant quantity Mog1 in the high pressure gas pipe portion E, the refrigerant quantity Mol1 in the high temperature side liquid pipe portion B1, the refrigerant quantity Mol2 in the low temperature side liquid pipe portion B2, and the refrigerant quantity Mlp in the liquid refrigerant communication pipe portion B3 are maintained substantially constant, and the refrigerant whose quantity has decreased in the gas refrigerant communication pipe portion G will move to the first low pressure gas pipe portion H, the second low pressure gas pipe portion I, the condenser portion A, the indoor unit portion F, and the second bypass circuit portion J. In other words, the refrigerant quantity Mog2 in the first low pressure gas pipe portion H, the refrigerant quantity Mog3 in the second low pressure gas pipe portion I, the refrigerant quantity Mc in the condenser portion A, the refrigerant quantity Mr in the indoor unit portion F, and the refrigerant quantity Mob in the second bypass circuit portion J will increase by the quantity of the refrigerant that has decreased in the gas refrigerant communication pipe portion G.

Such control as described above is performed as the process in Step S23 by the controller 8 (more specifically, by the indoor side controllers 34a to 34c, the connection side controllers 44a and 44b, the outdoor side controller 26, and the transmission line 81 that interconnects each of the controllers 34a to 34c, 44a, 44b, and 26) that functions as the pipe volume judging operation controlling means for performing the pipe volume judging operation to calculate the volume Vgp of the gas refrigerant communication pipe portion G.

Next in Step S24, the volume Vgp of the gas refrigerant communication pipe portion G is calculated by utilizing a phenomenon that the refrigerant quantity in the gas refrigerant communication pipe portion G decreases and the refrigerant whose quantity has decreased moves to other portions in the refrigerant circuit 10 because of the change from the first state to the second state.

First, a calculation formula used in order to calculate the volume Vgp of the gas refrigerant communication pipe portion G is described. Provided that the quantity of the refrigerant that has decreased in the gas refrigerant communication pipe portion G and moved to other portions in the refrigerant circuit 10 by the above described pipe volume judging operation is a refrigerant increase/decrease quantity $\Delta Mgp$, and that the increase/decrease quantities of the refrigerant in each portion between the first state and the second state are $\Delta Mc$, $\Delta Mog2$, $\Delta Mog3$, $\Delta Mr$, and $\Delta Mob$ (here, the refrigerant quantity Mog1, the refrigerant quantity Mol1, the refrigerant quantity Mol2, and the refrigerant quantity Mlp are omitted because they are maintained substantially constant), the refrigerant increase/decrease quantity $\Delta Mgp$ can be, for example, calculated by the following function expression:

$$\Delta Mgp = -(\Delta Mc + \Delta Mog2 + \Delta Mog3 + \Delta Mr + \Delta Mob).$$

Then, the value of $\Delta Mgp$ is divided by a density change quantity $\Delta \rho gp$ of the refrigerant between the first state and the second state in the gas refrigerant communication pipe portion G, and thereby the volume Vgp of the gas refrigerant communication pipe portion G can be calculated. Note that, although there is little effect on a calculation result of the refrigerant increase/decrease quantity $\Delta Mgp$, the refrigerant quantity Mog1, the refrigerant quantity Mol1, and the refrigerant quantity Mol2 may be included in the above described function expression.

$$Vgp = \Delta Mgp / \Delta \rho gp$$

Note that, $\Delta Mc$, $\Delta Mog\,2$, $\Delta Mog\,3$, $\Delta Mr$ and $\Delta Mob$ can be obtained by calculating the refrigerant quantity in the first state and the refrigerant quantity in the second state by using the above described relational expression for each portion in the refrigerant circuit 10 and further by subtracting the refrigerant quantity in the first state from the refrigerant quantity in the second state. In addition, the density change quantity $\Delta \rho gp$ can be obtained by calculating an average density among the density $\rho s$ of the refrigerant at the suction side of the compressor 21, the density $\rho oh$ of the refrigerant in the pipe on the high pressure gas side between the high pressure gas side stop valve V5 and the first high pressure gas on/off valve V8 in the outdoor unit 2, the density $\rho bsh$ of the refrigerant in the high pressure gas side refrigerant flow path in the connection units 4a and 4b, and the density ρeo of the refrigerant at the outlets of the indoor heat exchangers 31a to 31c in the first state and by subtracting the average density in the first state from the average density in the second state.

By using such calculation formula as described above, the volume Vgp of the gas refrigerant communication pipe portion G can be calculated from the operation state quantity of constituent equipment or the refrigerant flowing in the refrigerant circuit 10 in the first and second states.

In addition, the volume Vgp2 of the high pressure gas side refrigerant flow path and the low pressure gas side refrigerant flow path in the connection units 4a and 4b (including a portion corresponding to the third bypass refrigerant circuits 43a and 43b) is a value that is known prior to installation of the connection units 4a and 4b at the installation location. Thus, it is possible to determine the volume Vgp1 of the portion combining the high pressure gas refrigerant communication pipe 52, the low pressure gas refrigerant communication pipe 53, and the second gas refrigerant communication pipes 72a and 72b, which are the refrigerant pipes arranged on site when installing the air conditioner 1 at an installation location such as a building and the like, by subtracting the volume Vgp2 from the volume Vgp of the gas refrigerant communication pipe portion G, which is determined by the calculation.

Note that, in the present embodiment, the state is changed such that the second target value Pes2 in the second state becomes a pressure lower than the first target value Pes1 in the first state and therefore the refrigerant in the gas refrigerant communication pipe portion G is moved to other portions to increase the refrigerant quantity in other portions; thereby the volume Vlp in the gas refrigerant communication pipe portion G is calculated from the increased quantity. However, the state may be changed such that the second target value Pes2 in the second state becomes a pressure higher than the first target value Pes1 in the first state and therefore the refrigerant is moved from other portions to the gas refrigerant communication pipe portion G to decrease the refrigerant quantity in other portions; thereby the volume Vlp of the gas refrigerant communication pipe portion G may be calculated from the decreased quantity.

In this way, the process in Step S24 is performed by the controller 8 that functions as the pipe volume calculating means for a gas refrigerant communication pipe, which calculates the volume Vgp of the gas refrigerant communication pipe portion G from the operation state quantity of constituent equipment or the refrigerant flowing in the refrigerant circuit 10 during the pipe volume judging operation for the gas refrigerant communication pipe portion G.

(Step S25: Judging the Validity of a Result of Pipe Volume Judging Operation)

After the above described Step S21 to Step S24 are completed, in Step S25, whether or not a result of the pipe volume judging operation is valid, in other words, whether or not the volume Vlp of the liquid refrigerant communication pipe portion B3 and the volume Vgp of the gas refrigerant communication pipe portion G calculated by the pipe volume calculating means are valid is judged.

Specifically, as shown in an inequality expression below, it is judged by whether or not the ratio of the volume Vlp of the liquid refrigerant communication pipe portion B3 to the volume Vgp of the gas refrigerant communication pipe portion G obtained by the calculations is in a predetermined numerical value range.

$$\epsilon 1 < Vlp/Vgp < \epsilon 2$$

Here, $\epsilon 1$ and $\epsilon 2$ are values that are changed based on the minimum value and the maximum value of the pipe volume ratio in feasible combinations of the heat source unit and the utilization unit.

Then, when the volume ratio Vlp/Vgp satisfies the above described numerical value range, the process in Step S2 for the pipe volume judging operation is completed. When the volume ratio Vlp/Vgp does not satisfy the above numerical value range, the process for the pipe volume judging operation and the volume calculation in Step S21 to Step S24 is performed again.

In this way, the process in Step S25 is performed by the controller 8 that functions as a validity judging means for judging whether or not a result of the above described pipe volume judging operation is valid, in other words, whether or not the volume Vlp of the liquid refrigerant communication pipe portion B3 and the volume Vgp of the gas refrigerant communication pipe portion G calculated by the pipe volume calculating means are valid.

Note that, in the present embodiment, the pipe volume judging operation (Steps S21, S22) for the liquid refrigerant communication pipe portion B3 is first performed and then the pipe volume judging operation for the gas refrigerant communication pipe portion G (Steps S23, S24) is performed. However, the pipe volume judging operation for the gas refrigerant communication pipe portion G may be performed first.

In addition, in the above described Step S25, when a result of the pipe volume judging operation in Steps S21 to S24 is judged to be invalid a plurality of times, or when it is desired to more simply judge the volume Vlp of the liquid refrigerant communication pipe portion B3 and the volume Vgp of the gas refrigerant communication pipe portion G, although it is not shown in FIG. 6, for example, in Step S25, after a result of the pipe volume judging operation in Steps S21 to S24 is judged to be invalid, it is possible to proceed to the process for estimating, from the pressure loss in a portion combining the liquid refrigerant communication pipe portion B3 and the gas refrigerant communication pipe portion G (hereinafter referred to as "refrigerant communication pipe portion K"), the length of the refrigerant communication pipe portion K and calculating the volume Vlp of the liquid refrigerant communication pipe portion B3 and the volume Vgp of the gas refrigerant communication pipe portion G from the estimated pipe length and an average volume ratio, thereby obtaining the volume Vlp of the liquid refrigerant communication pipe portion B3 and the volume Vgp of the gas refrigerant communication pipe portion G.

In addition, in the present embodiment, the case where the pipe volume judging operation is performed to calculate the volume Vlp of the liquid refrigerant communication pipe portion B3 and the volume Vgp of the gas refrigerant communication pipe portion G is described on the premise that there is no information regarding the length, pipe diameter and the like of the refrigerant communication pipe portion K, and the volume Vlp of the liquid refrigerant communication pipe portion B3 and the volume Vgp of the gas refrigerant communication pipe portion G are unknown. However, when the pipe volume calculating means has a function to calculate the volume Vlp of the liquid refrigerant communication pipe portion B3 and the volume Vgp of the gas refrigerant communication pipe portion G by inputting information regarding the length, pipe diameters and the like of the refrigerant communication pipe portion K, such function may be used together.

Further, when the above described function to calculate the volume Vlp of the liquid refrigerant communication pipe portion B3 and the volume Vgp of the gas refrigerant communication pipe portion G by the pipe volume judging operation and by using the operation results is not used but only the function to calculate the volume Vlp of the liquid refrigerant communication pipe portion B3 and the volume Vgp of the gas refrigerant communication pipe portion G by inputting information regarding the length, pipe diameter and the like of the refrigerant communication pipe portion K is used, the above described validity judging means (Step S25) may be used to judge whether or not the input information regarding the lengths, pipe diameters and the like of the refrigerant communication pipe portion K is valid.

(Step S3: Initial Refrigerant Quantity Detection Operation)

Figure 9:
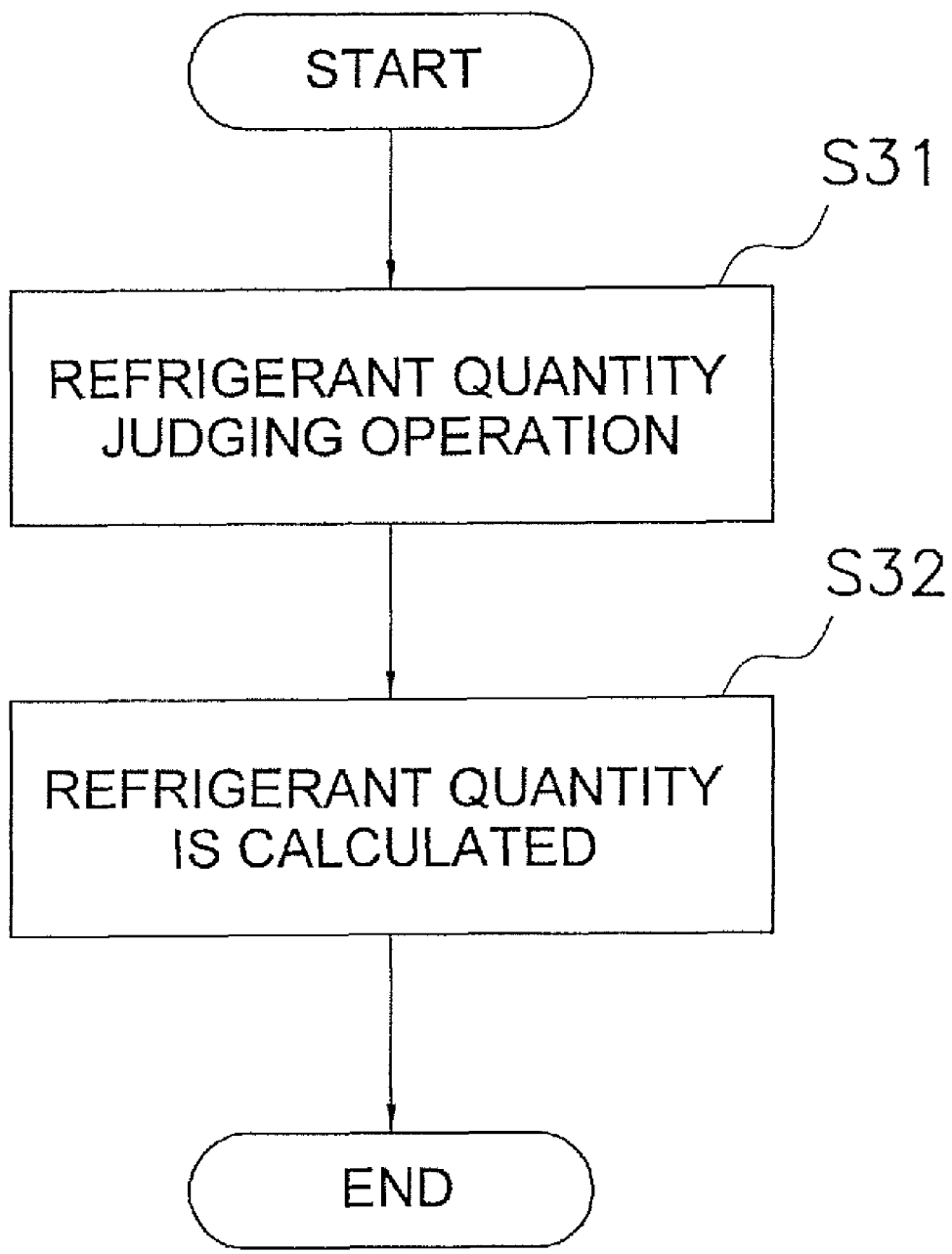
FIG. 9 is a flowchart of an initial refrigerant quantity detection operation.

When the above described pipe volume judging operation of Step S2 is completed, the process proceeds to the initial refrigerant quantity detection operation of Step S3. In the initial refrigerant quantity detection operation, the process in Step S31 and Step S32 shown in FIG. 9 is performed by the controller 8. Here, FIG. 9 is a flowchart of the initial refrigerant quantity detection operation.

(Step S31: Refrigerant Quantity Judging Operation)

In Step S31, as is the case with the above described refrigerant quantity judging operation of Step S11 in the automatic refrigerant charging operation, the refrigerant quantity judging operation, including the all indoor unit operation, condensation pressure control, liquid pipe temperature control, superheat control, and evaporation pressure control, is performed. Here, as a rule, values to be used for the target liquid pipe temperature value Tlps in the liquid pipe temperature control, the target superheating degree SHrs in the superheat control, and the target low pressure value Pes in the evaporation pressure control are same as the target values during the refrigerant quantity judging operation of Step S11 in the automatic refrigerant charging operation. Note that, as a rule, a value to be used for the target superheating degree SHrc of the indoor heat exchanger 31a is also same as the target value during the refrigerant quantity judging operation of Step S11 in the automatic refrigerant charging operation.

In this way, the process in Step S31 is performed by the controller 8 that functions as the refrigerant quantity judging operation controlling means for performing the refrigerant quantity judging operation including the all indoor unit operation, condensation pressure control, liquid pipe temperature control, superheat control, and evaporation pressure control.

(Step S32: Refrigerant Quantity Calculation)

Next, the refrigerant quantity in the refrigerant circuit 10 is calculated from the operation state quantity of constituent equipment or refrigerant flowing in the refrigerant circuit 10 in the initial refrigerant quantity detection operation in Step S32 by the controller 8 that functions as the refrigerant quantity calculating means while performing the above described refrigerant quantity judging operation. Calculation of the refrigerant quantity in the refrigerant circuit 10 is performed by using the above described relational expression between the refrigerant quantity in each portion in the refrigerant circuit 10 and the operation state quantity of constituent equipment or refrigerant flowing in the refrigerant circuit 10. However, at this time, the volume Vlp of the liquid refrigerant communication pipe portion B3 and the volume Vgp of the gas refrigerant communication pipe portion G, which were unknown at the time of after installation of constituent equipment of the air conditioner 1, have been calculated and the values thereof are known by the above described pipe volume judging operation. Thus, by multiplying the volume Vlp of the liquid refrigerant communication pipe portion B3 and the volume Vgp of the gas refrigerant communication pipe portion G by the density of the refrigerant, the refrigerant quantity Mlp in the liquid refrigerant communication pipe portion B3 and the refrigerant quantity Mgp in the gas refrigerant communication pipe portion G can be calculated, and further by adding the refrigerant quantity in each of other portions, the initial refrigerant quantity in the entire refrigerant circuit 10 can be detected. This initial refrigerant quantity is used as a reference refrigerant quantity Mi of the entire refrigerant circuit 10, which serves as a reference for judging whether or not there is a refrigerant leak from the refrigerant circuit 10 during the below described refrigerant leak detection operation. Therefore, it is stored as a value of the operation state quantity in the memory of the controller 8 serving as the state quantity storing means.

In this way, the process in Step S32 is performed by the controller 8 that functions as the refrigerant quantity calculating means for calculating the refrigerant quantity in each portion in the refrigerant circuit 10 from the operation state quantity of constituent equipment or refrigerant flowing in the refrigerant circuit 10 in the initial refrigerant quantity detection operation.

<Refrigerant Leak Detection Operation Mode>

Figure 10:
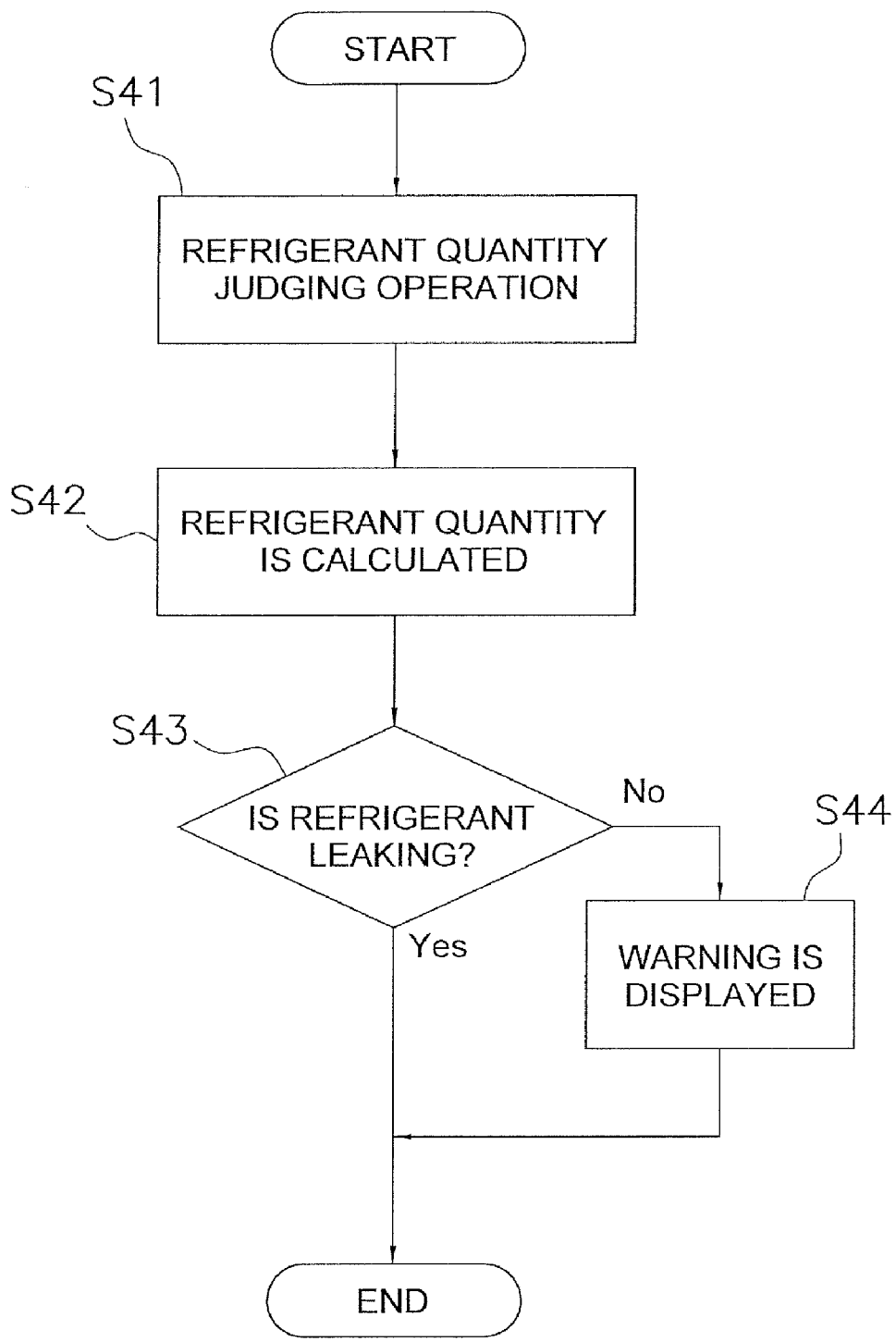
FIG. 10 is a flowchart of a refrigerant leak detection operation mode.

Next, the refrigerant leak detection operation mode is described with reference to FIGS. 1, 2, 5, and 10. Here, FIG. 10 is a flowchart of the refrigerant leak detection operation mode.

In the present embodiment, an example of a case is described where, whether or not the refrigerant in the refrigerant circuit 10 is leaking to the outside due to an unforeseen factor is detected periodically (for example, during a period of time such as on a holiday or in the middle of the night when air conditioning is not needed).

(Step S41: Refrigerant Quantity Judging Operation)

First, when operation in the normal operation mode such as the above described cooling operation and simultaneous cooling and heating operation has gone on for a certain period of time (for example, half a year to a year), the normal operation mode is automatically or manually switched to the refrigerant leak detection operation mode, and as is the case with the refrigerant quantity judging operation of the initial refrigerant quantity detection operation, the refrigerant quantity judging operation, including the all indoor unit operation, condensation pressure control, liquid pipe temperature control, superheating degree control, and evaporation pressure control, is performed. Here, as a rule, values that are the same as the target values in Step S31 of the refrigerant quantity judging operation of the initial refrigerant quantity detection operation are used for the target liquid pipe temperature Tlps in the liquid pipe temperature control, the target superheating degree SHrs in the superheating degree control, and the target low pressure Pes in the evaporation pressure control.

In the present embodiment, even in the case when the operation mode is changed from the normal operation mode to the refrigerant leak detection operation mode, the operation is performed in a manner so as to maintain the cooling capacity of the indoor unit 3c, and consequently the indoor unit 3c is controlled independently from the other indoor units 3a and 3b. Here, in the above described superheating degree control, the indoor expansion valve V9c of the indoor unit 3c is controlled such that the superheating degree SHrc of the indoor heat exchanger 31c becomes the target superheating degree SHrcs recorded in the built-in memory 35c of the indoor side controller 34c in the normal operation mode. In addition, the indoor expansion valves V9a and V9b of the indoor units 3a and 3b are controlled such that the overall superheating degree SHr of the indoor heat exchangers 31a to 31c becomes constant at the target superheating degree SHrs. In addition, in order for the evaporation pressure Pe of the refrigerant to be stably controlled by the evaporation pressure control, the indoor fans 32a to 32c are controlled such that each of the air flow rates Wra to Wrc of indoor air supplied to the indoor heat exchangers 31a to 31c becomes constant.

Note that, this refrigerant quantity judging operation is performed for each time the refrigerant leak detection operation is performed. Even when the refrigerant temperature Tco at the outlet of the outdoor heat exchanger 22 changes due to the different operating conditions, for example, such as when the condensation pressure Pc is different or when the refrigerant is leaking, the refrigerant temperature Tlp in the liquid refrigerant communication pipe portion B3 is maintained constant at the same target liquid pipe temperature Tlps by the liquid pipe temperature control.

In this way, the process in Step S41 is performed by the controller 8 that functions as the refrigerant quantity judging operation controlling means for performing the refrigerant quantity judging operation, including the all indoor unit operation, condensation pressure control, liquid pipe temperature control, superheating degree control, and evaporation pressure control.

(Step S42: Refrigerant Quantity Calculation)

Next, the refrigerant quantity in the refrigerant circuit 10 is calculated from the operation state quantity of constituent equipment or refrigerant flowing in the refrigerant circuit 10 in the refrigerant leak detection operation in Step S42 by the controller 8 that functions as the refrigerant quantity calculating means while performing the above described refrigerant quantity judging operation. Calculation of the refrigerant quantity in the refrigerant circuit 10 is performed by using the above described relational expression between the refrigerant quantity in each portion in the refrigerant circuit 10 and the operation state quantity of constituent equipment or refrigerant flowing in the refrigerant circuit 10. However, at this time, as is the case with the initial refrigerant quantity detection operation, the volume Vlp of the liquid refrigerant communication pipe portion B3 and the volume Vgp of the gas refrigerant communication pipe portion G, which were unknown at the time of after installation of constituent equipment of the air conditioner 1, have been calculated and the values thereof are known by the above described pipe volume judging operation. Thus, by multiplying the volume Vlp of the liquid refrigerant communication pipe portion B3 and the volume Vgp of the gas refrigerant communication pipe portion G by the density of the refrigerant, the refrigerant quantity Mlp in the liquid refrigerant communication pipe portion B3 and the refrigerant quantity Mgp in the gas refrigerant communication pipe portion G can be calculated, and further by adding the refrigerant quantity in each of other portions, the refrigerant quantity M in the entire refrigerant circuit 10 can be calculated.

Here, as described above, the refrigerant temperature Tlp in the liquid refrigerant communication pipe portion B3 is maintained constant at the target liquid pipe temperature Tlps by the liquid pipe temperature control. Therefore, regardless of the difference in the operating conditions for the refrigerant leak detection operation, the refrigerant quantity Mlp in the liquid refrigerant communication pipe portion B3 will be maintained constant even when the refrigerant temperature Tco at the outlet of the outdoor heat exchanger 22 changes.

In this way, the process in Step S42 is performed by the controller 8 that functions as the refrigerant quantity calculating means for calculating the refrigerant quantity at each portion in the refrigerant circuit 10 from the operation state quantity of constituent equipment or refrigerant flowing in the refrigerant circuit 10 in the refrigerant leak detection operation.

(Steps S43, S44: Judging the Adequacy of the Refrigerant Quantity, Warning Display)

When refrigerant leaks from the refrigerant circuit 10, the refrigerant quantity in the refrigerant circuit 10 decreases. Then, when the refrigerant quantity in the refrigerant circuit 10 decreases, mainly, a tendency of a decrease in the subcooling degree SCo at the outlet of the outdoor heat exchanger 22 appears. Along with this, the refrigerant quantity Mc in the outdoor heat exchanger 22 decreases, and the refrigerant quantities in other portions tend to be maintained substantially constant. Consequently, the refrigerant quantity M of the entire refrigerant circuit 10 calculated in the above described Step S42 is smaller than the reference refrigerant quantity Mi detected in the initial refrigerant quantity detection operation when the refrigerant is leaking from the refrigerant circuit 10; whereas when the refrigerant is not leaking from the refrigerant circuit 10, the refrigerant quantity M is substantially the same as the reference refrigerant quantity Mi.

By utilizing the above-described characteristics, whether or not the refrigerant is leaking is judged in Step S43. When it is judged in Step S43 that the refrigerant is not leaking from the refrigerant circuit 10, the refrigerant leak detection operation mode is finished.

On the other hand, when it is judged in Step S43 that the refrigerant is leaking from the refrigerant circuit 10, the process proceeds to Step S44, and a warning indicating that a refrigerant leak is detected is displayed on the warning display 9. Subsequently, the refrigerant leak detection operation mode is finished.

In this way, the process from Steps S42 to S44 is performed by the controller 8 that functions as a refrigerant leak detecting means, which is one of the refrigerant quantity judging means, and which detects whether or not the refrigerant is leaking by judging the adequacy of the refrigerant quantity in the refrigerant circuit 10 while performing the refrigerant quantity judging operation in the refrigerant leak detection operation mode.

As described above, in the air conditioner 1 in the present embodiment, the controller 8 functions as the refrigerant quantity judging operation means, the refrigerant quantity calculating means, the refrigerant quantity judging means, the pipe volume judging operation means, the pipe volume calculating means, the validity judging means, and the state quantity storing means, and thereby configures the refrigerant quantity judging system for judging the adequacy of the refrigerant quantity charged into the refrigerant circuit 10.

(3) Characteristics of the Air Conditioner (A)

In this air conditioner 1, even in the refrigerant quantity judging operation, the indoor unit in the machine room is caused to operate at the capacity sufficient to the cooling load of the machine room, thereby enabling to suppress a rise in the temperature in the machine room due to the insufficient capacity of the indoor unit and to reduce the occurrence of defects in equipment in the machine room.

(B)

In this air conditioner 1, the target low pressure Pes is the first target control value, and in the refrigerant quantity judging operation, the controller 8 controls constituent equipment such that the pressure of the refrigerant on the suction side of the compressor 21 or the operation state quantity equivalent to the pressure becomes constant at the target low pressure Pes. In addition, the target superheating degree SHrs is the first target control value, and in the refrigerant quantity judging operation, the controller 8 causes the indoor heat exchangers 31a to 31c to function as evaporators of the refrigerant, and also controls constituent equipment such that the superheating degree SHr of the refrigerant sent from the indoor heat exchangers 31a to 31c to the compressor 21 becomes constant at the target superheating degree SHrs.

Consequently, in the refrigerant quantity judging operation to control constituent equipment such that the operation state quantities become constant at the target low pressure Pes and the target superheating degree SHrs, the indoor unit 3c in the machine room is caused to operate at the capacity sufficient to the cooling load of the machine room, thereby enabling to suppress a rise in the temperature in the machine room due to the insufficient capacity of the indoor unit and to reduce the occurrence of defects in equipment in the machine room.

(C)

In this air conditioner 1, the target superheating degree SHrcs that is the second target control value of the indoor unit 3c used before the refrigerant quantity judging operation is recorded as history, and during the refrigerant quantity judging operation, the indoor unit 3c is controlled in the same manner as before the refrigerant quantity judging operation based on the history. Thereby the cooling capacity of the indoor unit 3c is maintained at the level equivalent to the cooling capacity required before the refrigerant quantity judging operation.

Consequently, it is possible to maintain the cooling capacity of the indoor unit 3c at the level of the capacity required before the refrigerant quantity judging operation. Thus, even in the refrigerant quantity judging operation, the indoor unit 3c in the machine room can be caused to operate at the capacity sufficient to the cooling load of the machine room, and it is possible to suppress a rise in the temperature in the machine room due to the insufficient capacity of the indoor unit 3c and to reduce the occurrence of defects in equipment in the machine room.

(4) Alternative Embodiment

While a preferred embodiment of the present invention has been described with reference to the figures, the scope of the present invention is not limited to the above embodiment, and the various changes and modifications may be made without departing from the scope of the present invention.

(A)

Figure 11:
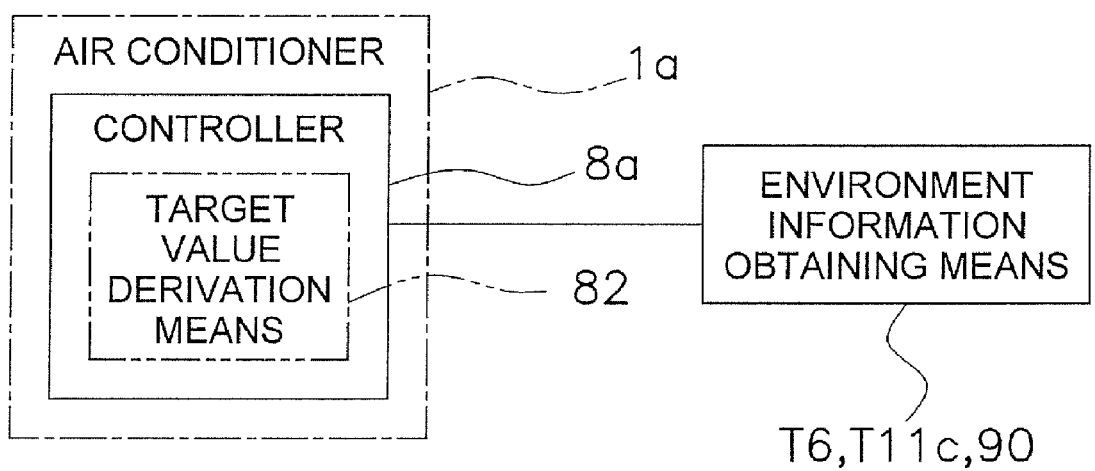
FIG. 11 is a relationship diagram between a controller and an environment information obtaining means according to another embodiment (A).
Figure 12:
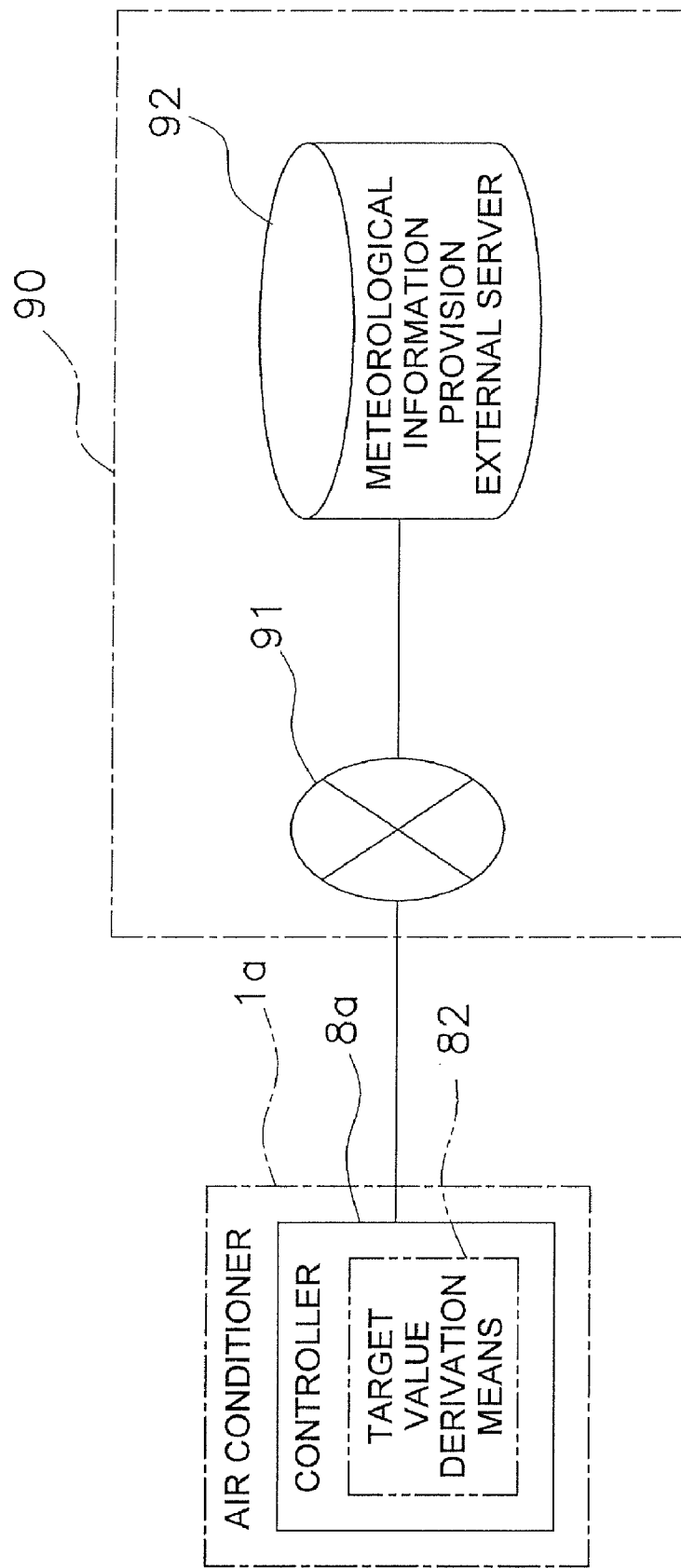
FIG. 12 is a schematic diagram of a meteorological information obtaining network according to another embodiment (A).

In the above described embodiment, the controller 8 records, as history, the target superheating degree SHrcs that is the second target control value of the indoor unit 3c used before the refrigerant quantity judging operation, and during the refrigerant quantity judging operation, the indoor unit 3c is controlled in the same manner as before the refrigerant quantity judging operation based on the history. Thereby the cooling capacity of the indoor unit 3c is maintained at the level equivalent to the cooling capacity required before the refrigerant quantity judging operation. However, it is not limited thereto. The air conditioner may further include environment information obtaining means T6, T11c, and 90 and a target value derivation means 82, and be configured to obtain the environment information regarding the inside of the machine room and to derive the third target control value at which the predetermined space is optimally air conditioned based on the obtained environment information; consequently control the indoor unit 3c such the third target control value is reached; and thus perform control to maintain the cooling capacity of the indoor unit 3c at the level of the capacity required before the refrigerant quantity judging operation. Note that, the "environment information obtaining means" used herein refers to, for example, the outdoor temperature sensor T6 provided to the outdoor unit 2, the room temperature sensor T11c provided in the predetermined space or to the indoor unit 3c, and the like (see FIGS. 1, 2, and 11). In addition, it may be a meteorological information obtaining network 90 connected to the meteorological information provision external server 92 via the network 91 (see FIG. 12). Note that the "environment information" used herein refers to, for example, the outside air temperature, temperature in the predetermined space, meteorological information, and the like. In addition, the "third target control value" used herein refers to, for example, the target superheating degree of the indoor unit 3c and the like.

Accordingly, because the indoor unit 3c is controlled based on the third target control value during the refrigerant quantity judging operation, it is possible to maintain the cooling capacity of the indoor unit 3c at the level equivalent to the cooling capacity required before the refrigerant quantity judging operation. Consequently, even in the refrigerant quantity judging operation, the indoor unit 3c in the machine room can be caused to operate at the capacity sufficient to the cooling load of the machine room, and it is possible to suppress a rise in the temperature in the machine room due to the insufficient capacity of the indoor unit 3c and to reduce the occurrence of defects in equipment in the machine room.

(B)

In the above described embodiment, an air-cooled outdoor unit that uses the outdoor air as the heat source is used as the outdoor unit 2 of the air conditioner 1, however, a water-cooled type or ice thermal storage type outdoor unit may be used instead. In addition, the air conditioner in the above described embodiment is configured as a multi-air conditioner capable of performing the simultaneous cooling and heating operation, however, it is not limited thereto. It may be an air conditioner configured as a multi-air conditioner exclusively used for the cooling operation.

(C)

In the above described embodiment, the controller 8 that performs the operation control of the entire air conditioner 1 is configured by the outdoor side controller 26, the indoor side controllers 34a to 34c, and the connection side controllers 44a and 44b as they exchange control signals via the transmission line 81. However, it is not limited thereto. A controller that performs the operation control of the entire air conditioner 1 may be provided in the outdoor unit 2, in the indoor units 3a to 3c, or in the connection units 4a and 4b; or, a single unit may be provided as a control unit.

INDUSTRIAL APPLICABILITY

The air conditioner according to the present invention can suppress a rise in the temperature in a predetermined space due to the insufficient capacity of a utilization unit and to reduce the occurrence of defects in equipment in the predetermined space, and is useful as an air conditioner having a function to judge the adequacy of the refrigerant quantity in a refrigerant circuit of the air conditioner: more specifically, it is useful as an air conditioner having a function to judge the adequacy of the refrigerant quantity in a refrigerant circuit of the air conditioner configured by the interconnection of a compressor, a condenser, an expansion mechanism, and an evaporator.

What is claimed is:

1. An air conditioner, comprising:
a refrigerant circuit being configured by the interconnection of a heat source unit having a compressor and a heat source side heat exchanger, a plurality of utilization units having utilization side heat exchangers, and expansion mechanisms; and
an operation control unit being configured to perform a refrigerant quantity judging operation to control constituent equipment such that a first state value becomes a first target control value,
during the refrigerant quantity judging operation, the operation control unit maintaining a cooling capacity of a first utilization unit among the plurality of utilization units, the first utilization unit being configured to air condition a predetermined space.

2. The air conditioner according to claim 1, wherein
the first target control value is a target low pressure, and
in the refrigerant quantity judging operation, the operation control unit controls constituent equipment such that a pressure of the refrigerant on a suction side of the compressor or an operation state quantity equivalent to the pressure becomes constant at the target low pressure.

3. The air conditioner according to claim 2, further comprising
a history recorder being configured to record history of a second target control value that is a target control value of the first utilization unit, wherein
during the refrigerant quantity judging operation, the operation control unit derives the second target control value used before the refrigerant quantity judging operation based on the history, and controls the first utilization unit at the second target control value.

4. The air conditioner according to claim 3, wherein
the second target control value is a target superheating degree of the first utilization unit.

5. The air conditioner according to claim 2, further comprising
an environment information obtaining unit being configured to obtain environment information regarding the outside of the building or the inside of the predetermined space, and
a target value derivation unit configured to derive a third target control value at which the predetermined space is optimally air conditioned based on the environment information,
wherein
the operation control unit controls the operation of the first utilization unit based on the third target control value during the refrigerant quantity judging operation.

6. The air conditioner according to claim 1, wherein
the first target control value is a target superheating degree, and
in the refrigerant quantity judging operation, the operation control unit causes the utilization side heat exchangers to function as evaporators of the refrigerant, and also controls constituent equipment such that a superheating degree of the refrigerant sent from the utilization side heat exchangers to the compressor becomes constant at the target superheating degree.

7. The air conditioner according to claim 6, further comprising
a history recorder being configured to record history of a second target control value that is a target control value of the first utilization unit, wherein
during the refrigerant quantity judging operation, the operation control unit derives the second target control value used before the refrigerant quantity judging operation based on the history, and controls the first utilization unit at the second target control value.

8. The air conditioner according to claim 7, wherein
the second target control value is a target superheating degree of the first utilization unit.

9. The air conditioner according to claim 6, further comprising
an environment information obtaining unit being configured to obtain environment information regarding the outside of the building or the inside of the predetermined space, and
a target value derivation unit configured to derive a third target control value at which the predetermined space is optimally air conditioned based on the environment information,
wherein
the operation control unit controls the operation of the first utilization unit based on the third target control value during the refrigerant quantity judging operation.

10. The air conditioner according to claim 9, wherein
the third target control value is a target superheating degree of the first utilization unit.

11. The air conditioner according to claim 9, wherein
the environment information obtaining unit is a temperature sensor provided to the heat source unit, and configured to obtain an outside air temperature as the environment information.

12. The air conditioner according to claim 9, wherein
the environment information obtaining unit is a temperature sensor provided in the predetermined space, and configured to obtain a temperature in the predetermined space as the environment information.

13. The air conditioner according to claim 9, wherein
the environment information obtaining unit is configured to obtain, via a network, meteorological information from a meteorological information provision server being configured to provide the meteorological information as the environment information.

14. The air conditioner according to claim 1, further comprising
a history recorder being configured to record history of a second target control value that is a target control value of the first utilization unit, wherein
during the refrigerant quantity judging operation, the operation control unit derives the second target control value used before the refrigerant quantity judging operation based on the history, and controls the first utilization unit at the second target control value.

15. The air conditioner according to claim 14, wherein
the second target control value is a target superheating degree of the first utilization unit.

16. The air conditioner according to claim 1, further comprising
an environment information obtaining unit being configured to obtain environment information regarding the outside of the building or the inside of the predetermined space, and
a target value derivation unit configured to derive a third target control value at which the predetermined space is optimally air conditioned based on the environment information,
wherein
the operation control unit controls the operation of the first utilization unit based on the third target control value during the refrigerant quantity judging operation.

17. The air conditioner according to claim 16, wherein the third target control value is a target superheating degree of the first utilization unit.

18. The air conditioner according to claim 16, wherein the environment information obtaining unit is a temperature sensor provided to the heat source unit, and configured to obtain an outside air temperature as the environment information.

19. The air conditioner according to claim 16, wherein the environment information obtaining unit is a temperature sensor provided in the predetermined space, and configured to obtain a temperature in the predetermined space as the environment information.

20. The air conditioner according to claim 16, wherein the environment information obtaining unit is configured to obtain, via a network, meteorological information from a meteorological information provision server being configured to provide the meteorological information as the environment information.

* * * * *